US012646320B2

(12) United States Patent
Hogyoku

(10) Patent No.: US 12,646,320 B2
(45) Date of Patent: Jun. 2, 2026

(54) SENSOR DEVICE WITH ADAPTIVE NEURAL NETWORK PRE-PROCESSING CIRCUIT AND SEMICONDUCTOR DEVICE

(71) Applicant: Sony Semiconductor Solutions Corporation, Atsugi (JP)

(72) Inventor: Susumu Hogyoku, Atsugi (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 278 days.

(21) Appl. No.: 18/551,865

(22) PCT Filed: Feb. 1, 2022

(86) PCT No.: PCT/JP2022/003858
§ 371 (c)(1),
(2) Date: Sep. 22, 2023

(87) PCT Pub. No.: WO2022/209253
PCT Pub. Date: Oct. 6, 2022

(65) Prior Publication Data
US 2024/0177485 A1    May 30, 2024

(30) Foreign Application Priority Data
Apr. 2, 2021    (JP) ................................. 2021-063552

(51) Int. Cl.
*G06V 20/40*        (2022.01)
*G06V 10/20*        (2022.01)
(Continued)
(52) U.S. Cl.
CPC .............. *G06V 20/44* (2022.01); *G06V 10/20* (2022.01); *G06V 10/82* (2022.01); *G06V 20/46* (2022.01); *H04N 25/77* (2023.01); *H04N 25/78* (2023.01)

(58) Field of Classification Search
CPC ........ H04N 25/77; H04N 25/78; H04N 23/60; G06T 7/00; G06V 20/44; G06V 20/46; G06V 10/20; G06V 10/82
See application file for complete search history.

(56) References Cited

U.S. PATENT DOCUMENTS

2018/0357504 A1    12/2018  Zamir et al.
2019/0364230 A1*   11/2019  Yeo ...................... H04N 25/709
(Continued)

FOREIGN PATENT DOCUMENTS

CN          111369482  A      7/2020
JP          2019-091102  A     6/2019

OTHER PUBLICATIONS

International Search Report and Written Opinion mailed on Apr. 26, 2022, received for PCT Application PCT/JP2022/003858, filed on Feb. 1, 2022, 9 pages including English Translation.

*Primary Examiner* — Kelly L Jerabek
(74) *Attorney, Agent, or Firm* — XSENSUS LLP

(57) ABSTRACT

A sensor device includes: multiple pixel circuits each of which includes a light receiver and generates an event signal corresponding to presence or absence of an event in accordance with a light reception result of the light receiver; and a pre-processing circuit that generates processing information on the basis of the multiple event signals, and supplies the processing information to a processing circuit including a neural network. The pre-processing circuit includes: a first weighted addition circuit that performs a weighted addition process on the basis of two or more of the event signals generated by respective two or more pixel circuits among the multiple pixel circuits; and a first determination circuit that generates a first feature value signal on the basis of a result of the weighted addition process in the first weighted (Continued)

addition circuit. The pre-processing circuit generates processing information based on the first feature value signal.

20 Claims, 33 Drawing Sheets

(51) Int. Cl.
*G06V 10/82* (2022.01)
*H04N 25/77* (2023.01)
*H04N 25/78* (2023.01)

(56) References Cited

U.S. PATENT DOCUMENTS

2020/0410272 A1* 12/2020 Seo ...................... G06V 10/147
2021/0042938 A1* 2/2021 Chen ......................... G06T 7/20
2022/0301278 A1* 9/2022 Lu ........................... G06V 10/94

* cited by examiner

SENSOR DEVICE WITH ADAPTIVE NEURAL NETWORK PRE-PROCESSING CIRCUIT AND SEMICONDUCTOR DEVICE

CROSS-REFERENCE TO RELATED APPLICATIONS

The present application is based on PCT filing PCT/JP2022/003858, filed Feb. 1, 2022, and claims priority from Japanese Patent Application No. 2021-063552, filed Apr. 2, 2021, the entire contents of each are incorporated herein by reference.

TECHNICAL FIELD

The present disclosure relates to a sensor device and a semiconductor device that perform processing on the basis of on an event signal.

BACKGROUND ART

In a so-called event-based vision sensor, event signals are generated on the basis of a light reception result of photodiodes, and image data is generated on the basis of the event signals. For example, PTL 1 discloses a device that performs visual odometry processing using a neural network on the basis of data generated by an event camera.

CITATION LIST

Patent Literature

PTL 1: Japanese Unexamined Patent Application Publication No. 2019-91102

SUMMARY OF THE INVENTION

In such a device, it is desired to reduce a computation amount of a processing circuit using a neural network, and a further reduction of the computation amount is expected.

It is desirable to provide a sensor device and a semiconductor device that make it possible to reduce a computation amount of a processing circuit.

A sensor device according to one embodiment of the present disclosure includes multiple pixel circuits and a pre-processing circuit. Each of the multiple pixel circuits includes a light receiver and is configured to generate an event signal corresponding to presence or absence of an event in accordance with a light reception result of the light receiver. The pre-processing circuit is configured to generate processing information on the basis of the multiple event signals, and supply the processing information to a processing circuit including a neural network. The pre-processing circuit includes: a first weighted addition circuit that performs a weighted addition process on the basis of two or more of the event signals generated by respective two or more pixel circuits among the multiple pixel circuits; and a first determination circuit that generates a first feature value signal on the basis of a result of the weighted addition process in the first weighted addition circuit. The pre-processing circuit generates the processing information on the basis of the first feature value signal.

A semiconductor device according to one embodiment of the present disclosure includes a pre-processing circuit. The pre-processing circuit is configured to generate processing information on the basis of multiple event signals corresponding to presence or absence of events and generated by multiple pixel circuits, and supply the processing information to a processing circuit including a neural network. The pre-processing circuit includes a first weighted addition circuit and a first determination circuit. The first weighted addition circuit is configured to perform a weighted addition process on the basis of two or more of the event signals generated by respective two or more pixel circuits among the multiple pixel circuits. The first determination circuit is configured to generate a first feature value signal on the basis of a result of the weighted addition process in the first weighted addition circuit. The pre-processing circuit generates the processing information on the basis of the first feature value signal.

In the sensor device and the semiconductor device according to one embodiment of the present disclosure, the multiple event signals corresponding to the presence or absence of events are generated in the multiple pixel circuits. In the pre-processing circuit, the processing information is generated on the basis of the multiple event signals, and the processing information is supplied to the processing circuit including the neural network. In the pre-processing circuit, the weighted addition process is performed on the basis of two or more event signals generated by two or more pixel circuits among the multiple pixel circuits, and the first feature value signal is generated on the basis of the result of the weighted addition process. Further, in the pre-processing circuit, the processing information is generated on the basis of the first feature value signal.

BRIEF DESCRIPTION OF DRAWINGS

FIG. 28 is an explanatory diagram illustrating an operation example of the sensor device illustrated in FIG. 26.

MODES FOR CARRYING OUT THE INVENTION

Some embodiments of the present disclosure are described below in detail with reference to the drawings. It is to be noted that the description is given in the following order.

1. Embodiment
2. Example of Application to Mobile Body

1. First Embodiment

Configuration Example

Figure 1:
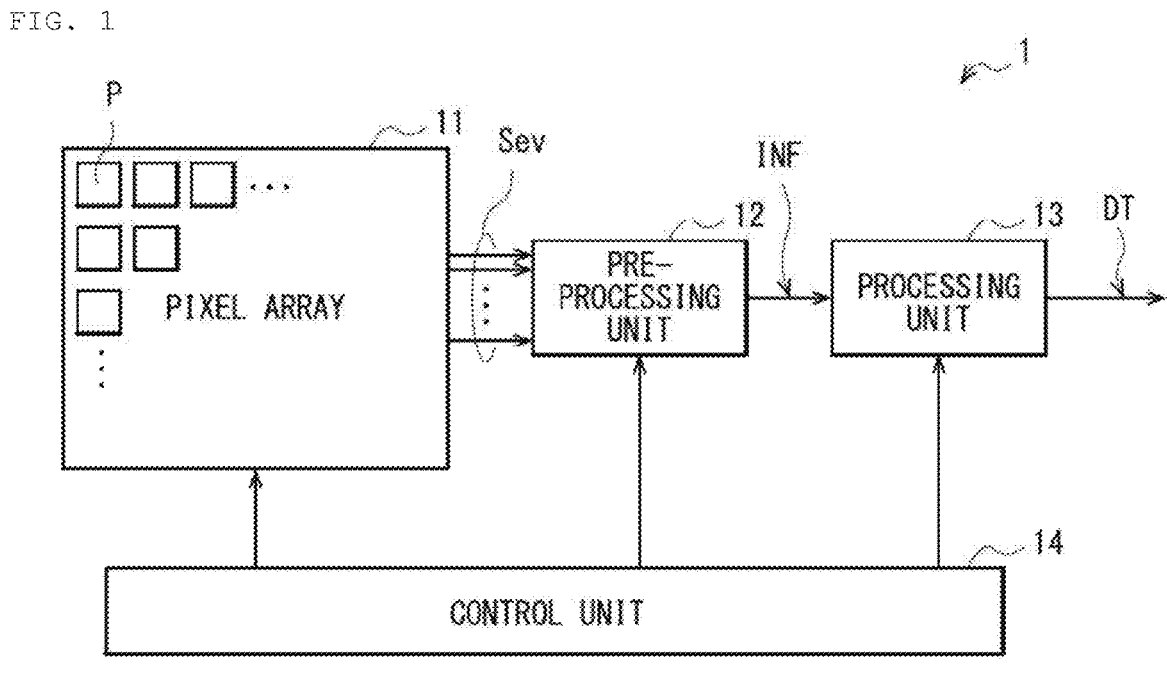
FIG. 1 is a block diagram illustrating a configuration example of a sensor device according to an embodiment of the present disclosure.

FIG. 1 illustrates a configuration example of a sensor device (sensor device 1) according to an embodiment. The sensor device 1 is an event-based vision sensor. It is to be noted that a semiconductor device according to an embodiment of the present disclosure is embodied by the present embodiment, and thus is also described. The sensor device 1 includes a pixel array 11, a pre-processing unit 12, a processing unit 13, and a control unit 14.

The pixel array 11 includes multiple pixels P arranged in a matrix. The pixel P includes a photodiode PD, and is configured to generate an event signal Sev corresponding to the presence or absence of an event on the basis of a light reception result of the photodiode PD.

Figure 2:
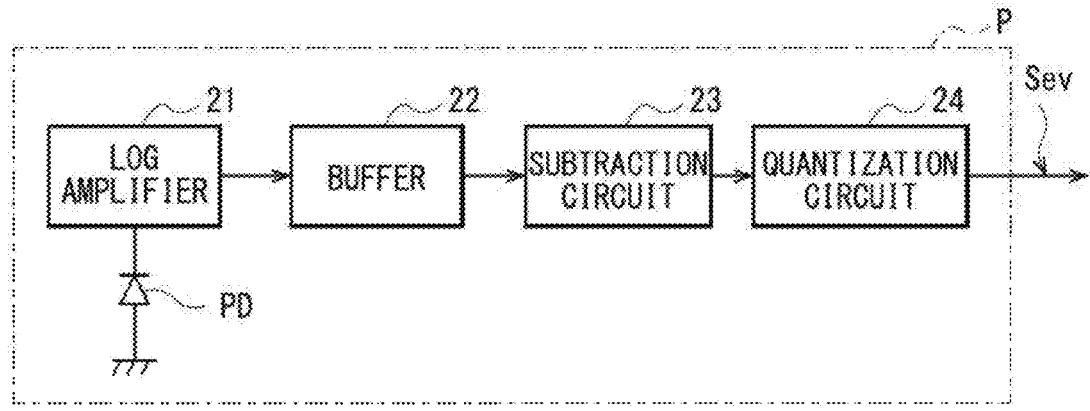
FIG. 2 is a block diagram illustrating a configuration example of a pixel illustrated in FIG. 1.

FIG. 2 illustrates a configuration example of the pixel P. The pixel P includes the photodiode PD, a LOG amplifier 21, a buffer 22, a subtraction circuit 23, and a quantization circuit 24.

The photodiode PD is a photoelectric converter that generates electric charges of an amount corresponding to a received light amount. The photodiode PD has an anode grounded, and a cathode coupled to an input terminal of the LOG amplifier 21.

The LOG amplifier 21 is configured to convert a current corresponding to the received light amount of the photodiode PD into a voltage. The LOG amplifier 21 has the input terminal coupled to the cathode of the photodiode PD, and an output terminal coupled to an input terminal of the buffer 22. The LOG amplifier 21 utilizes logarithmic characteristics of diodes and transistors to convert the current into the voltage.

The buffer 22 has a high input impedance and a low output impedance, and is configured to output a signal corresponding to a signal supplied from the LOG amplifier 21. The buffer 22 has the input terminal coupled to the output terminal of the LOG amplifier 21, and an output terminal coupled to an input terminal of the subtraction circuit 23. The buffer 22 is configured using, for example, a source follower circuit.

The subtraction circuit 23 includes, for example, a sample hold circuit. The subtraction circuit 23 is configured to sample the signal supplied from the buffer 22, hold the sampled signal, and thereafter output a signal corresponding to a difference between the signal supplied from the buffer 22 and the held signal. The subtraction circuit 23 has the input terminal coupled to the output terminal of the buffer 22, and an output terminal coupled to the quantization circuit 24.

The quantization circuit 24 is configured to generate the event signal Sev by performing a quantization process on the basis of the signal outputted from the subtraction circuit 23. Specifically, for example, the quantization circuit 24 sets the event signal Sev to a low level in a case where a change in the received light amount is less than a predetermined amount, and sets the event signal Sev to a high level in a case where the received light amount increases by the predetermined amount or more or the received light amount decreases by the predetermined amount or more. That is, the quantization circuit 24 outputs a pulse signal as the event signal Sev, in a case where the received light amount changes by the predetermined amount or more. Thus, the quantization circuit 24 determines that an event has occurred in a case where the received light amount changes by the predetermined amount or more, and outputs a pulse signal.

The pre-processing unit 12 is configured to generate processing information INF by performing processing on the basis of multiple event signals Sev generated by the pixel array 11. The pre-processing unit 12 performs the processing each time an event occurs, on the basis of the multiple event signals Sev.

Figure 3:
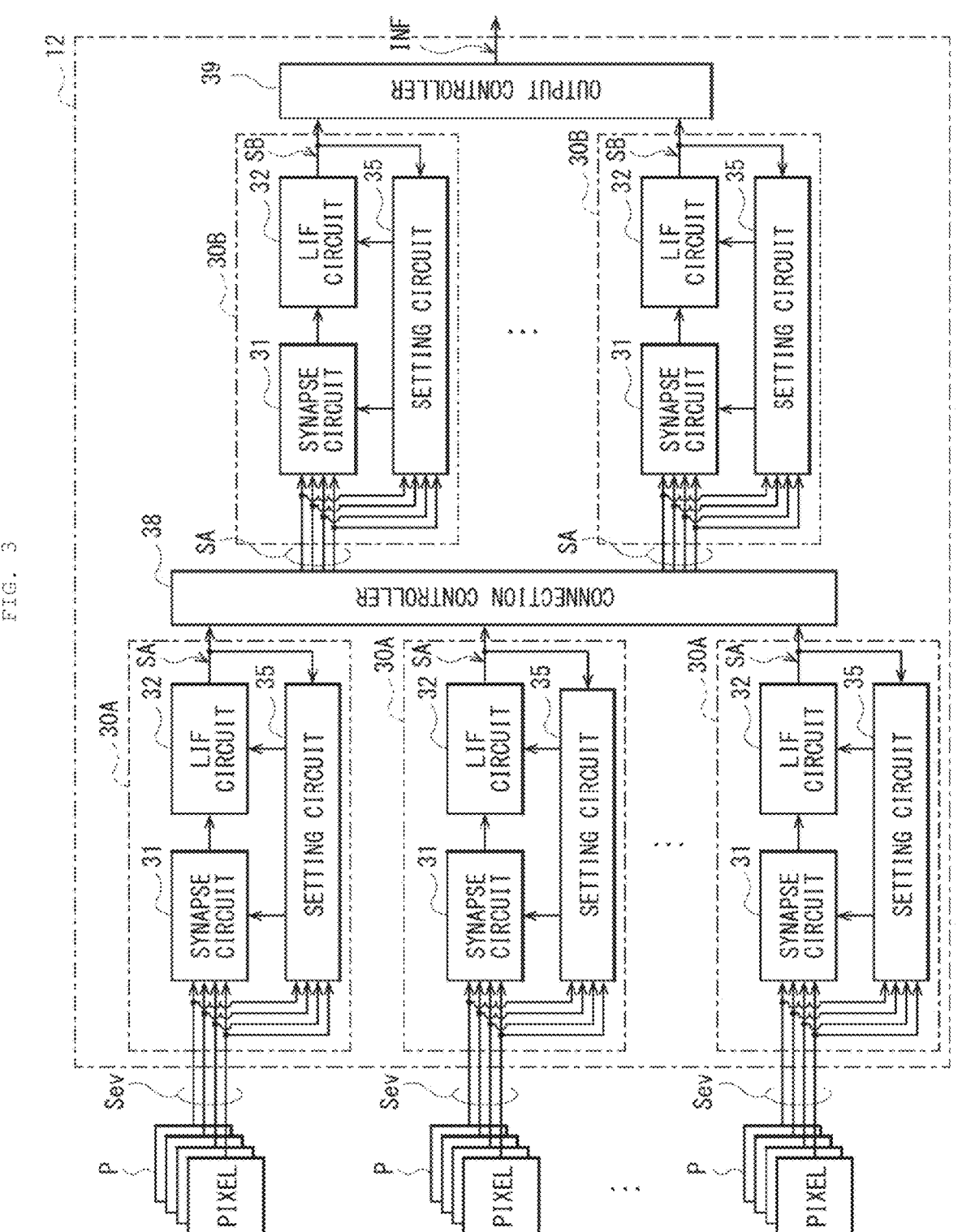
FIG. 3 is a block diagram illustrating a configuration example of a pre-processing unit illustrated in FIG. 1.

FIG. 3 illustrates a configuration example of the pre-processing unit 12. It is to be noted that this drawing also illustrates the multiple pixels P in the pixel array 11. The pre-processing unit 12 includes multiple neuron circuits 30, a connection controller 38, and an output controller 39. The pre-processing unit 12 configures a spiking neural network. In this example, the pre-processing unit 12 includes two layers including a preceding layer and a subsequent layer. It is to be noted that the present disclosure is not limited thereto, and the pre-processing unit 12 may include one layer or include three or more layers.

The multiple neuron circuits 30 include multiple neuron circuits 30A and multiple neuron circuits 30B. The multiple neuron circuits 30A configure the preceding layer, and the multiple neuron circuits 30B configure the subsequent layer.

The neuron circuit 30A is configured to generate a feature value signal SA on the basis of multiple (four in this example) event signals Sev supplied from multiple (four in this example) pixels P. The neuron circuit 30A includes a synapse circuit 31, a LIF (Leaky Integrate-and-Fire) circuit 32, and a setting circuit 35.

In this example, the synapse circuit 31 is configured to perform, on the basis of the four event signals Sev supplied from the four pixels P, a weighted addition process using four weighting factors W corresponding to these respective four event signals Sev. The four weighting factors W are set by the setting circuit 35.

The LIF circuit 32 is configured to generate the feature value signal SA on the basis of a signal supplied from the synapse circuit 31.

Figure 4:
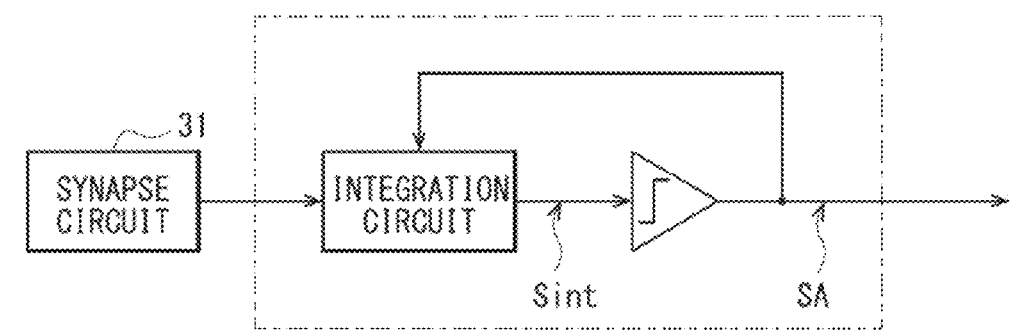
FIG. 4 is a block diagram illustrating a configuration example of a LIF circuit illustrated in FIG. 3.

FIG. 4 illustrates a configuration example of the LIF circuit 32. FIG. 4 also illustrates the synapse circuit 31. The LIF circuit 32 includes an integration circuit 33 and a comparison circuit 34.

The integration circuit 33 is configured to generate an integration signal Sint by integrating the signal supplied from the synapse circuit 31. The integration circuit 33 is able to reset the integration signal Sint on the basis of the feature value signal SA.

The comparison circuit 34 is configured to generate the feature value signal SA by comparing the integration signal Sint supplied from the integration circuit 33 with a threshold TH. The comparison circuit 34 outputs a pulse signal as the feature value signal SA in a case where the integration signal Sint exceeds the threshold TH. The threshold TH is set by the setting circuit 35.

The setting circuit 35 is configured to set the four weighting factors W to be used in the synapse circuit 31 and set the threshold TH to be used in the LIF circuit 32 by performing a learning process on the basis of the four event signals Sev and the feature value signal SA.

The connection controller 38 (FIG. 3) is configured to control to which neuron circuit 30B among the multiple neuron circuits 30B each of the feature value signals SA supplied from the multiple neuron circuits 30A is to be supplied. The connection controller 38 performs processing, for example, on the basis of a control signal supplied from the control unit 14.

The neuron circuit 30B is configured to generate a feature value signal SB on the basis of multiple (four in this example) feature value signals SA supplied from the connection controller 38. The neuron circuit 30B has the same configuration as that of the neuron circuit 30A in this example. Specifically, the neuron circuit 30B includes the synapse circuit 31, the LIF circuit 32, and the setting circuit 35. In this example, the synapse circuit 31 is configured to perform, on the basis of the four feature value signals SA supplied from the connection controller 38, the weighted addition process using four weighting factors W corresponding to these respective four feature value signals SA. The LIF circuit 32 is configured to generate the feature value signal SB on the basis of the signal supplied from the synapse circuit 31. The setting circuit 35 is configured to set the four weighting factors W to be used in the synapse circuit 31 and set the threshold TH to be used in the LIF circuit 32 by performing a learning process on the basis of the four feature value signals SA and the feature value signal SB.

The output controller 39 is configured to generate the processing information INF on the basis of the feature value signals SB supplied from the multiple neuron circuits 30B. The processing information INF includes information about a position of the pixel P where an event has occurred. That is, for example, a certain feature value signal SB is generated on the basis of four feature value signals SA inputted to the neuron circuit 30B that has generated the feature value signal SB. The feature value signal SA is generated on the basis of the event signals Sev supplied from the four pixels P in this example. Therefore, the feature value signal SB is based on events in 16 pixels P. For example, in a case where a pulse signal occurs in a certain feature value signal SB, the output controller 39 outputs, as the processing information INF, information about timing of the pulse signal and information about the position of the pixel P corresponding to the feature value signal SB. The output controller 39 performs processing, for example, on the basis of a control signal supplied from the control unit 14.

The processing unit 13 (FIG. 1) is configured to analyze a detection target of the sensor device 1 using a neural network NN, on the basis of the processing information INF, and output the analysis result as a data signal DT. For example, the processing unit 13 may perform a process of recognizing the detection target of the sensor device 1 or detecting a motion of the detection target. The processing unit 13 includes, for example, a processor and a memory, and performs processing by executing software. The processing unit 13 performs the processing, for example, on the basis of a control signal supplied from the control unit 14.

The control unit 14 is configured to control operation of the sensor device 1 by supplying control signals to the pixel array 11, the pre-processing unit 12, and the processing unit 13.

Here, the multiple pixels P correspond to a specific example of "multiple pixel circuits" in the present disclosure. The photodiode PD corresponds to a specific example of a "light receiver" in the present disclosure. The event signal Sev corresponds to a specific example of an "event signal" in the present disclosure. The pre-processing unit 12 corresponds to a specific example of a "pre-processing circuit" in the present disclosure. The processing information INF corresponds to a specific example of "processing information" in the present disclosure. The processing unit 13 corresponds to a specific example of a "processing circuit" in the present disclosure. The synapse circuit 31 of the neuron circuit 30A corresponds to a specific example of a "first weighted addition circuit" in the present disclosure. The LIF circuit 32 of the neuron circuit 30A corresponds to a specific example of a "first determination circuit" in the present disclosure. The feature value signal SA corresponds to a specific example of a "first feature value signal" in the present disclosure. The integration circuit 33 of the neuron circuit 30A corresponds to a specific example of a "first integration circuit" in the present disclosure. The comparison circuit 34 of the neuron circuit 30A corresponds to a specific example of a "first comparison circuit" in the present disclosure. The setting circuit 35 of the neuron circuit 30A corresponds to a specific example of a "setting circuit" in the present disclosure. The synapse circuit 31 of the neuron circuit 30B corresponds to a specific example of a "second weighted addition circuit" in the present disclosure. The LIF circuit 32 of the neuron circuit 30B corresponds to a specific example of a "second determination circuit" in the present disclosure. The feature value signal SB corresponds to a specific example of a "second feature value signal" in the present disclosure. The output controller 39 corresponds to a specific example of an "output control circuit" in the present disclosure.

Operation and Workings

Next, the operation and workings of the sensor device 1 of the present embodiment will be described.

Overview of Overall Operation

First, an outline of the overall operation of the sensor device 1 will be described with reference to FIG. 1. Each of the multiple pixels P in the pixel array 11 generates the event signal Sev corresponding to the presence or absence of an event, on the basis of the light reception result of the photodiode PD. The pre-processing unit 12 generates the processing information INF by performing processing on the basis of the multiple event signals Sev generated by the pixel array 11. In the processing unit 13, the processing unit 13

(FIG. 1) analyzes the detection target of the sensor device 1 using the neural network NN on the basis of the processing information INF, and outputs the analysis result as the data signal DT. The control unit 14 controls the operation of the sensor device 1 by supplying control signals to the pixel array 11, the pre-processing unit 12, and the processing unit 13.

Detailed Operation

In the pre-processing unit 12, each of the multiple neuron circuits 30A generates the feature value signal SA on the basis of the four event signals Sev supplied from the four pixels P.

Figure 5:
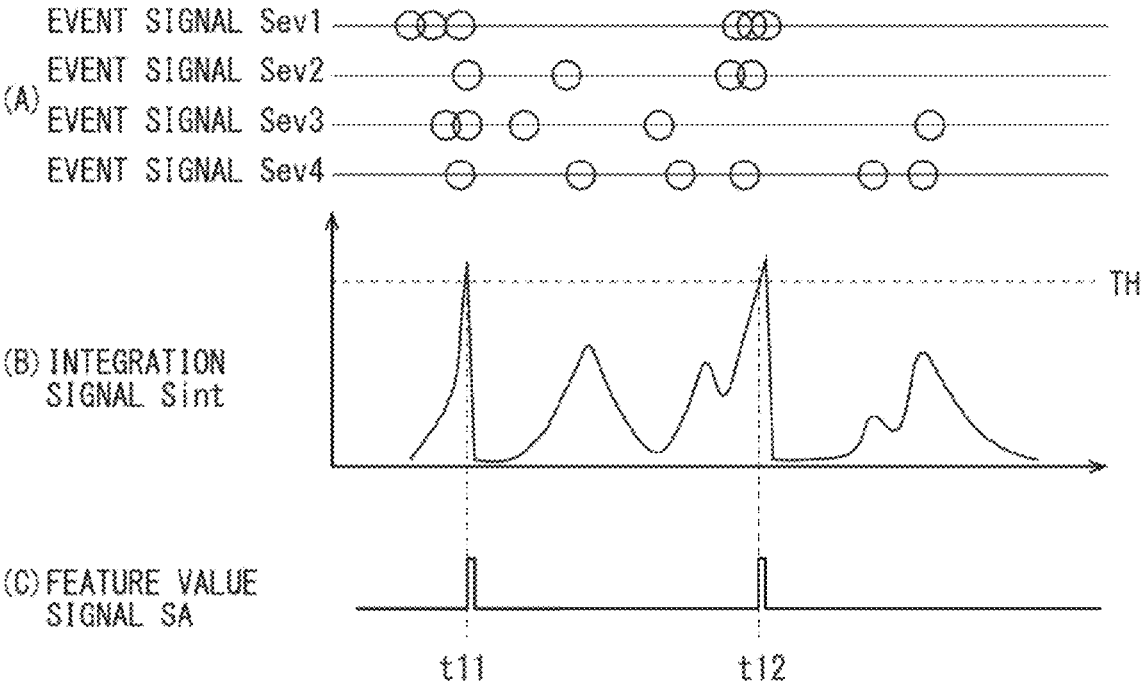
FIG. 5 is a timing waveform diagram illustrating an operation example of a neuron circuit illustrated in FIG. 3.

FIG. 5 illustrates an operation example of the neuron circuit 30A. In FIG. 5, (A) illustrates the four event signals Sev (event signals Sev1 to Sev4), (B) illustrates a waveform of the integration signal Sint generated by the integration circuit 33, and (C) illustrates a waveform of the feature value signal SA. In (A) of FIG. 5, "o" indicates a pulse signal corresponding to an event.

As illustrated in (A) of FIG. 5, the four pixels P each generate the event signal Sev corresponding to the presence or absence of an event, on the basis of the light reception result of the photodiode PD. The four pixels P asynchronously generate pulse signals in response to occurrence of events.

On the basis of these four event signals Sev, the synapse circuit 31 performs the weighted addition process using the four weighting factors W corresponding to these respective four event signals Sev. The integration circuit 33 generates the integration signal Sint by integrating the signal supplied from the synapse circuit 31 ((B) of FIG. 5). The integration signal Sint increases with an increase in frequency of events. In addition, the integration signal Sint decreases gradually in a case where no event occurs.

The comparison circuit 34 generates the feature value signal SA by comparing such an integration signal Sint with the threshold TH ((C) of FIG. 5). For example, when the integration signal Sint exceeds the threshold TH at a timing t11, the comparison circuit 34 causes the feature value signal SA to transition from a low level to a high level. The integration circuit 33 resets the integration signal Sint on the basis of the transition of the feature value signal SA. Therefore, the integration signal Sint decreases. This makes the integration signal Sint lower than the threshold TH, and the comparison circuit 34 thus causes the feature value signal SA to transition from the high level to the low level. The same applies to the operation around a timing t12.

In this manner, each of the multiple neuron circuits 30A generates the feature value signal SA on the basis of the four event signals Sev supplied from the four pixels P.

The connection controller 38 controls to which neuron circuit 30B among the multiple neuron circuits 30B each of the feature value signals SA supplied from the multiple neuron circuits 30A is to be supplied.

Each of the multiple neuron circuits 30B generates the feature value signal SB on the basis of the four feature value signals SA supplied from the connection controller 38. The operation of the neuron circuit 30B is similar to that of the neuron circuit 30A (FIG. 5).

The output controller 39 generates the processing information INF on the basis of the feature value signals SB supplied from the multiple neuron circuits 30B.

On the basis of the processing information INF, the processing unit 13 analyzes the detection target of the sensor device 1 using the neural network NN, and outputs the analysis result as the data signal DT.

Figure 6:
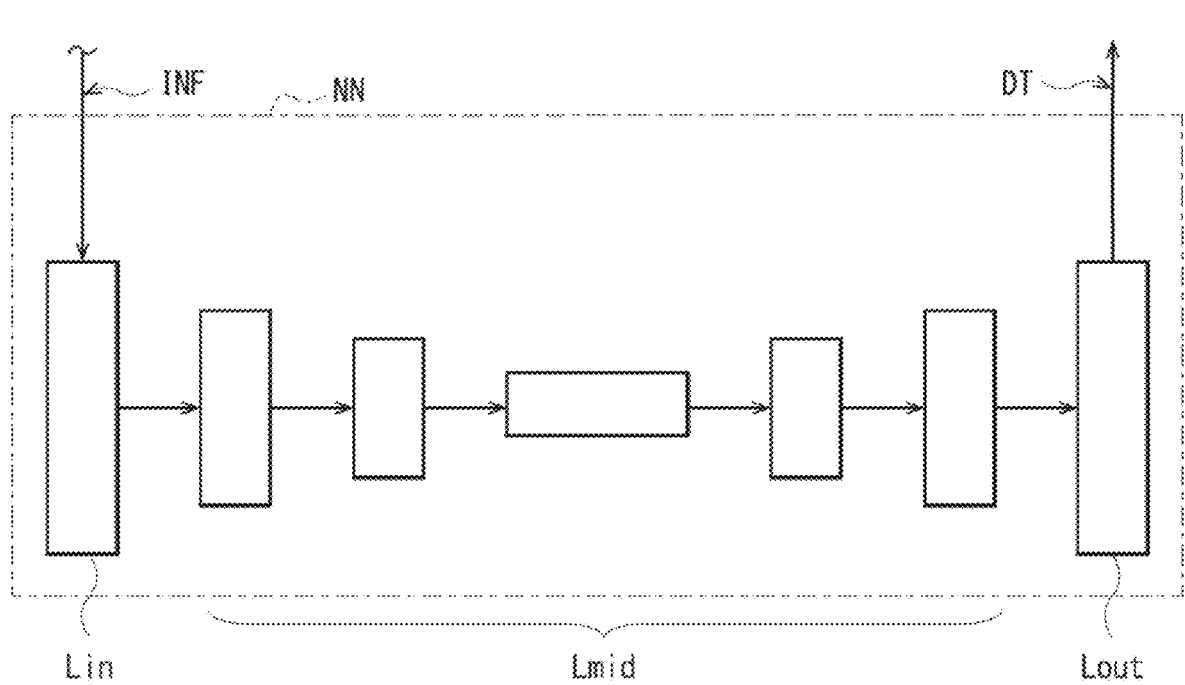
FIG. 6 is an explanatory diagram illustrating an example of a neural network in a processing unit illustrated in FIG. 1.

FIG. 6 schematically illustrates an example of the neural network NN in the processing unit 13. In this example, the neural network NN includes seven layers. In FIG. 6, the leftmost layer is an input layer Lin, the rightmost layer is an output layer Lout, and five layers between the input layer Lin and the output layer Lout are intermediate layers Lmid. It is to be noted that the number of layers is not limited to seven layers, and may be six or less layers or eight or more layers. The processing unit 13 uses this neural network NN to perform processing on the basis of the processing information INF inputted to the input layer Lin. Further, the processing unit 13 outputs information obtained by the output layer Lout as the data signal DT.

Figure 7:
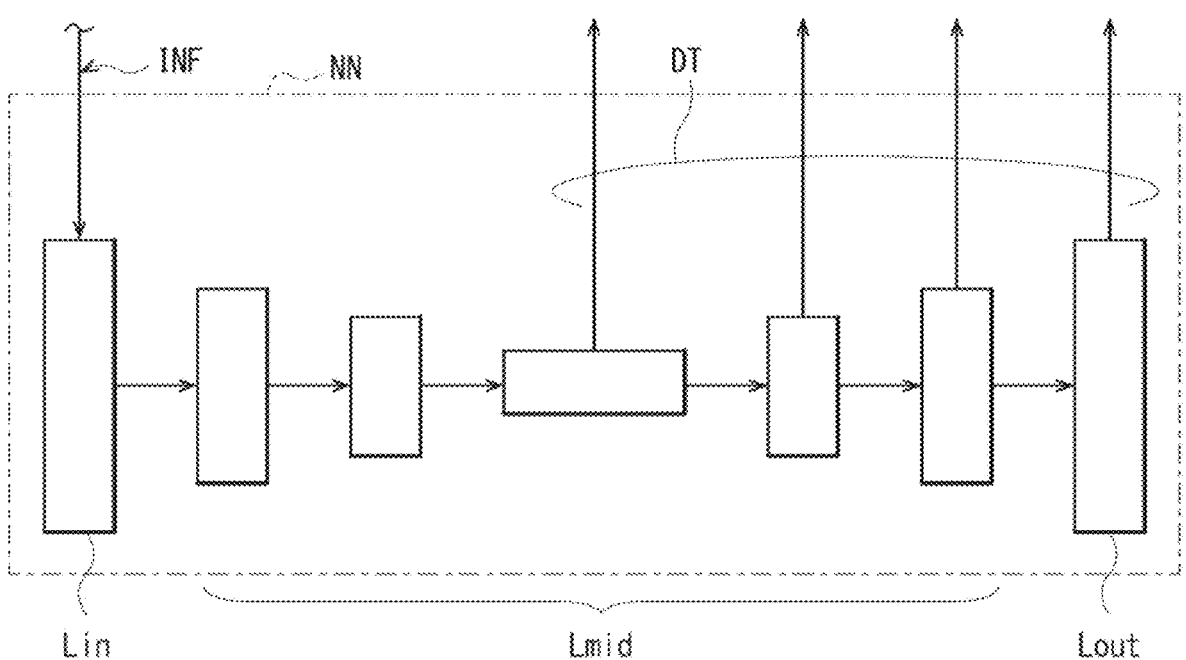
FIG. 7 is an explanatory diagram illustrating another example of the neural network in the processing unit illustrated in FIG. 1.

FIG. 7 schematically illustrates another example of the neural network NN in the processing unit 13. The processing unit 13 uses this neural network NN to perform processing on the basis of the processing information INF inputted to the input layer Lin. Further, in this example, the processing unit 13 outputs information obtained by the intermediate layers Lmid and the output layer Lout as the data signal DT.

Thus, the sensor device 1 includes the multiple pixels P and the pre-processing unit 12. Each of the multiple pixels P includes the photodiode PD, and generates the event signal Sev corresponding to the presence or absence of an event in accordance with the light reception result of the photodiode PD. The pre-processing unit 12 generates the processing information INF on the basis of the multiple event signals, and supplies the processing information INF to the processing unit 13 including the neural network. The pre-processing unit 12 includes the synapse circuit 31 and the LIF circuit 32. The synapse circuit 31 performs the weighted addition process on the basis of two or more (four in this example) event signals Sev generated by respective two or more pixels P (four pixels P in this example) among the multiple pixels P. The LIF circuit 32 generates the feature value signal SA on the basis of a result of the weighted addition process in the synapse circuit 31. The pre-processing unit 12 generates the processing information INF on the basis of the feature value signal SA. Thus, the sensor device 1 is able to reduce a data rate of the processing information INF supplied to the processing unit 13, which makes it possible to reduce a computation amount of the processing unit 13.

That is, for example, in a case where the pre-processing unit 12 is not provided, the event signals Sev generated by the multiple pixels P are supplied directly to the processing unit 13. In such a sensor device, increasing temporal resolution can increase the data rate of the data supplied to the processing unit 13. In this case, the computation amount in the processing unit 13 increases. In this case, for example, power consumption in the processing unit 13 increases. In addition, the processing unit 13 having a high computing power has to be provided.

In contrast, in the sensor device 1, the pre-processing unit 12 is provided, which makes it possible to lower the data rate of the data supplied to the processing unit 13. That is, for example, in the neuron circuit 30A, the synapse circuit 31 is able to reduce the number of signals by performing the weighted addition process on the four event signals Sev. The integration circuit 33 of the LIF circuit 32 generates the integration signal Sint by integrating the result of the weighted addition process in the synapse circuit 31, and the comparison circuit 34 generates the feature value signal SA by comparing the integration signal Sint with the threshold TH. Appropriately setting the threshold TH in the comparison circuit 34 makes it possible to lower a data rate of the feature value signal SA. Thus, the sensor device 1 is able to reduce the data rate of the data supplied to the processing unit 13, making it possible to reduce the computation amount of the processing unit 13. For example, in a case where the feature value signal SA generated by a certain neuron circuit 30A includes a large number of pulses and the feature value signal SA generated by another neuron circuit 30A includes a small number of pulses, adjusting the threshold TH in these neuron circuits 30A makes it possible to bring the numbers of pulses of the feature value signals SA generated by these neuron circuits 30A to the same level. Thus, the sensor device 1 is able to increase, for example, processing accuracy.

Effects

As described above, in the present embodiment, the multiple pixels and the pre-processing unit are provided. Each of the multiple pixels includes the photodiode, and generates the event signal corresponding to the presence or absence of an event in accordance with the light reception result of the photodiode. The pre-processing unit generates the processing information on the basis of the multiple event signals, and supplies the processing information to the processing unit including the neural network. The pre-processing unit includes the synapse circuit and the LIF circuit. The synapse circuit performs the weighted addition process on the basis of two or more event signals generated by respective two or more pixels among the multiple pixels. The LIF circuit generates the feature value signal on the basis of a result of the weighted addition process in the synapse circuit. The pre-processing unit generates the processing information on the basis of the feature value signal. Thus, it is possible to reduce the data rate of the processing information supplied to the processing unit, which makes it possible to reduce the computation amount of the processing unit.

Modification Example 1

In the above-described embodiment, the pre-processing unit 12 generates the processing information INF by performing processing each time an event occurs, on the basis of the multiple event signal Sev, but the present disclosure is not limited thereto. Alternatively, the pre-processing unit 12 may perform processing on the basis of multiple event signals Sev in a predetermined time, for example, each time the predetermined time elapses.

Figure 8:
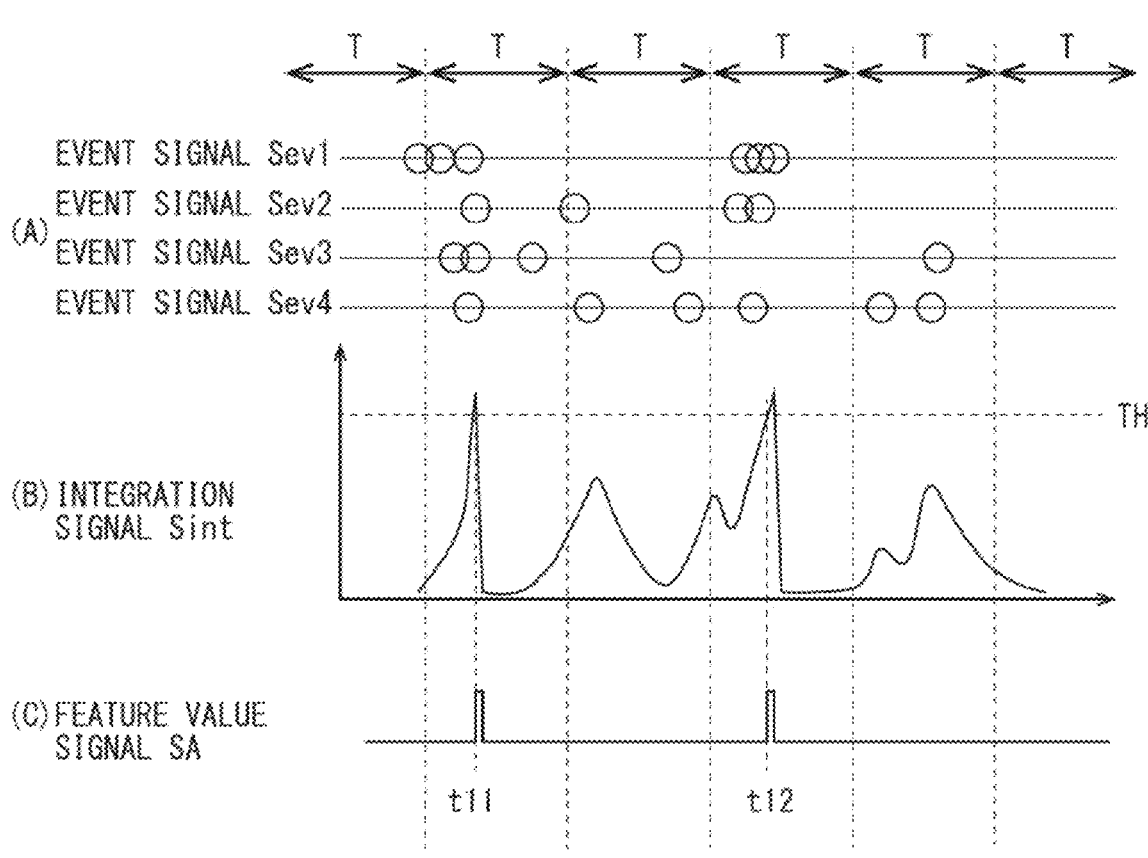
FIG. 8 is a timing waveform diagram illustrating an operation example of a neuron circuit according to a modification example.

FIG. 8 illustrates an operation example of the neuron circuit 30A. The operation of the neuron circuit 30A is similar to that in the above-described embodiment (FIG. 5). In this example, a period T having a predetermined time length is repeatedly set. In each of the multiple periods T, the feature value signal SA may or may not include a pulse signal. In addition, although not illustrated, the feature value signal SA may include multiple pulse signals in a certain period T. In this example, the neuron circuit 30A is described as an example. The same applies to the neuron circuit 30B. In each of the multiple periods T, the output controller 39 of the pre-processing unit 12 checks, for example, whether or not a certain feature value signal SB includes a pulse signal, and outputs, as the processing information INF, information whether or not the feature value signal SB includes a pulse signal, and information about the position of the pixel P corresponding to the feature value signal SB.

Figure 9:
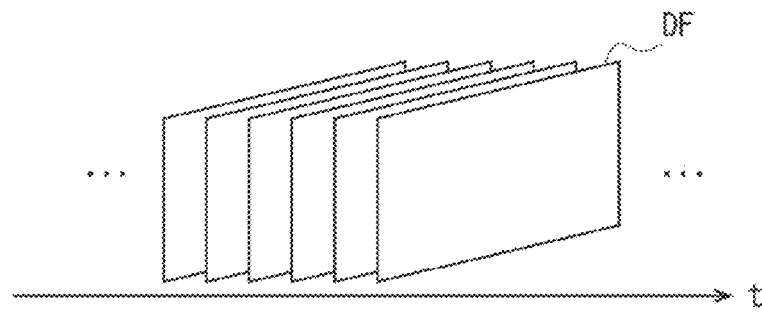
FIG. 9 is an explanatory diagram illustrating an operation example of a pre-processing unit according to the modification example.

FIG. 9 schematically illustrates a data format of the processing information INF. The output controller 39 generates one piece of frame data DF, on the basis of multiple feature value signals SB in a certain period T. For example, in a case where a certain feature value signal SB includes a pulse signal in a certain period T, the output controller 39 sets "1" at the position of the pixel P corresponding to the feature value signal SB in the frame data DF. In a case where a certain feature value signal SB includes no pulse signal in a certain period T, the output controller 39 sets "0" at the position of the pixel P corresponding to the feature value signal SB in the frame data DF. In this manner, the output controller 39 generates the frame data DF. The output controller 39 sequentially generates the frame data DF by performing such processing in each of the multiple periods T.

In this example, the output controller 39 of the pre-processing unit 12 generates the frame data DF by checking whether or not the feature value signal SB includes a pulse signal, but the present disclosure is not limited thereto. Alternatively, the output controller 39 may generate the frame data DF by checking how many pulse signals the feature value signal SB includes.

For example, in a case where a certain feature value signal SB includes one pulse signal in a certain period T, "1" is set at the position of the pixel P corresponding to the feature value signal SB in the frame data DF. In addition, in a case where a certain feature value signal SB includes two pulse signals in a certain period T, "2" is set at the position of the pixel P corresponding to the feature value signal SB in the frame data DF. In addition, in a case where a certain feature value signal SB includes no pulse signal in a certain period T, "0" is set at the position of the pixel P corresponding to the feature value signal SB in the frame data DF.

Modification Example 2

In the above-described embodiment, the pixel P determines that an event has occurred in a case where the received light amount changes by the predetermined amount or more, but the present disclosure is not limited thereto. Alternatively, for example, the pixel P may determine that events different from each other have occurred, between a case where the received light amount increases by the predetermined amount or more and a case where the received light amount decreases by the predetermined amount or more. The present modification example will be described in detail below.

A sensor device 1A according to the present modification example includes a pixel array 11A and a pre-processing unit 12A, as in the sensor device 1 (FIG. 1) according to the above-described embodiment.

Figure 10:
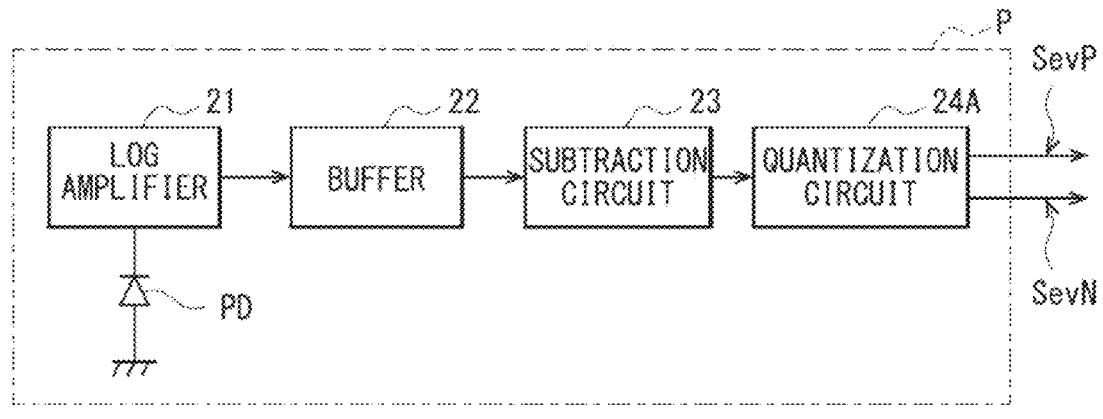
FIG. 10 is a block diagram illustrating a configuration example of a pixel according to another modification example.

FIG. 10 illustrates a configuration example of the pixel P in the pixel array 11A. The pixel P includes a quantization circuit 24A. The quantization circuit 24A is configured to generate two event signals SevP and SevN by performing a quantization process on the basis of the signal outputted from the subtraction circuit 23. Specifically, the quantization circuit 24A sets the event signal SevP to a high level and the event signal SevN to a low level in a case where the change in the received light amount is less than the predetermined amount. In addition, the quantization circuit 24A sets both of the event signals SevP and SevN to the low level in a case where the received light amount increases by the predetermined amount or more. In addition, the quantization circuit 24A sets both of the event signals SevP and SevN to the high level in a case where the received light amount decreases by the predetermined amount or more. That is, the quantization circuit 24 determines that an event has occurred and outputs a pulse signal as the event signal SevP, in a case where the received light amount increases by the predetermined amount or more, and determines that an event has occurred and outputs a pulse signal as the event signal SevN, in a case where the received light amount decreases by the predetermined amount or more.

Figure 11:
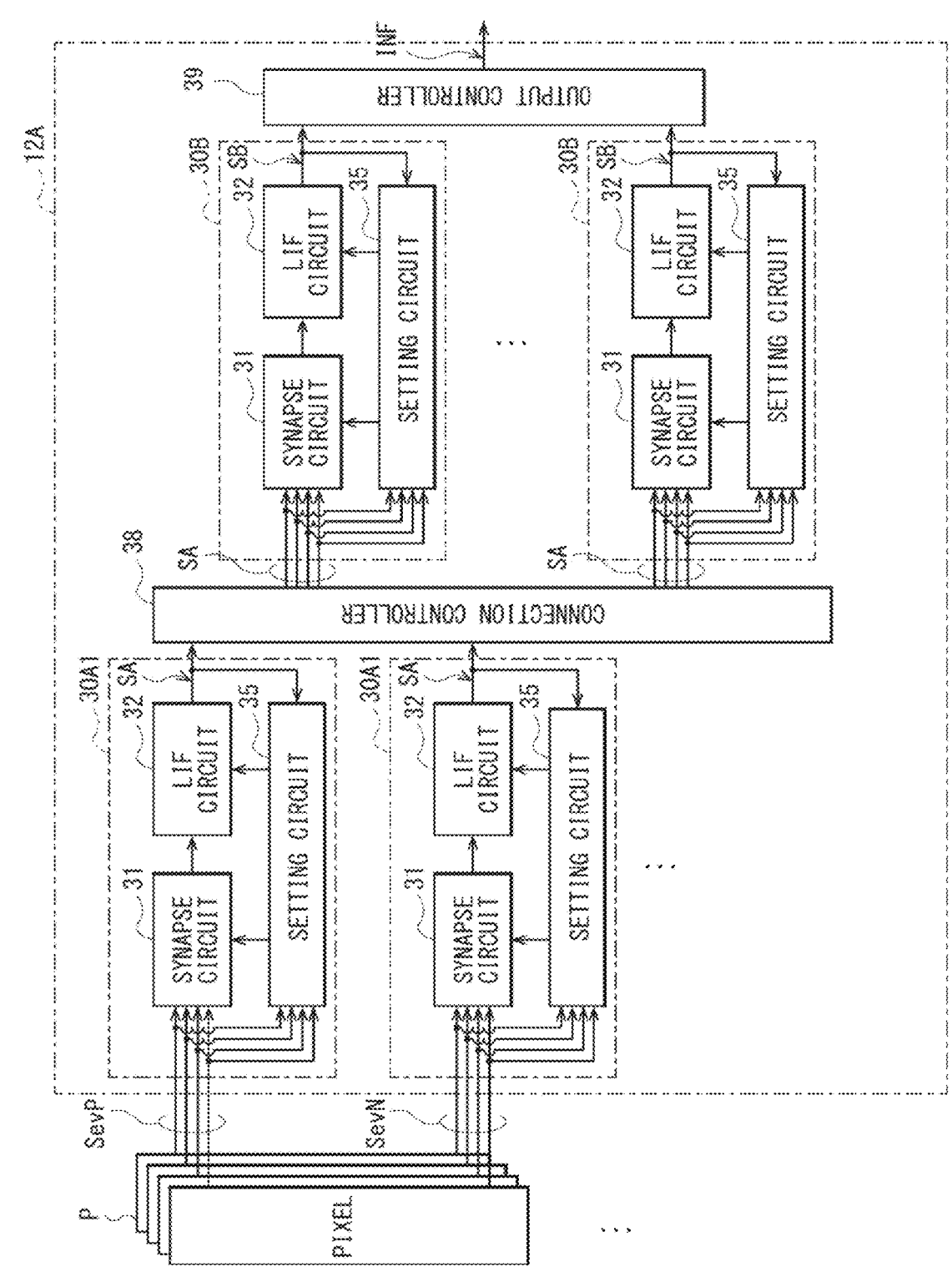
FIG. 11 is a block diagram illustrating a configuration example of a pre-processing unit according to another modification example.

FIG. 11 illustrates a configuration example of the pre-processing unit 12A. The pre-processing unit 12A includes multiple neuron circuits 30A1 and 30A2. The multiple neuron circuits 30A1 and 30A2 configure the preceding layer, as with the multiple neuron circuits 30A according to the above-described embodiment.

In this example, the neuron circuit 30A1 is configured to generate the feature value signal SA on the basis of four event signals SevP supplied from four pixels P. In this example, the neuron circuit 30A2 is configured to generate the feature value signal SA on the basis of four event signals SevN supplied from four pixels P. Each of the neuron circuits 30A1 and 30A2 may have, for example, the same configuration as that of the neuron circuit 30A according to the above-described embodiment.

Thus, the pre-processing unit 12A is able to generate the processing information INF including more detailed information, as compared with the case of the above-described embodiment, on the basis of the event signals SevP and SevN. On the basis of such processing information INF, the processing unit 13 is able to analyze the detection target in more detail.

In this example, the pixel P generates the two event signals SevP and SevN on the basis of two types of events, but the present disclosure is not limited thereto. Alternatively, the pixel P may generate one event signal Sev on the basis of two types of events.

A sensor device 1B according to the present modification example includes a pixel array 11B and the pre-processing unit 12, as in the sensor device 1 (FIG. 1) according to the above-described embodiment.

Figure 12:
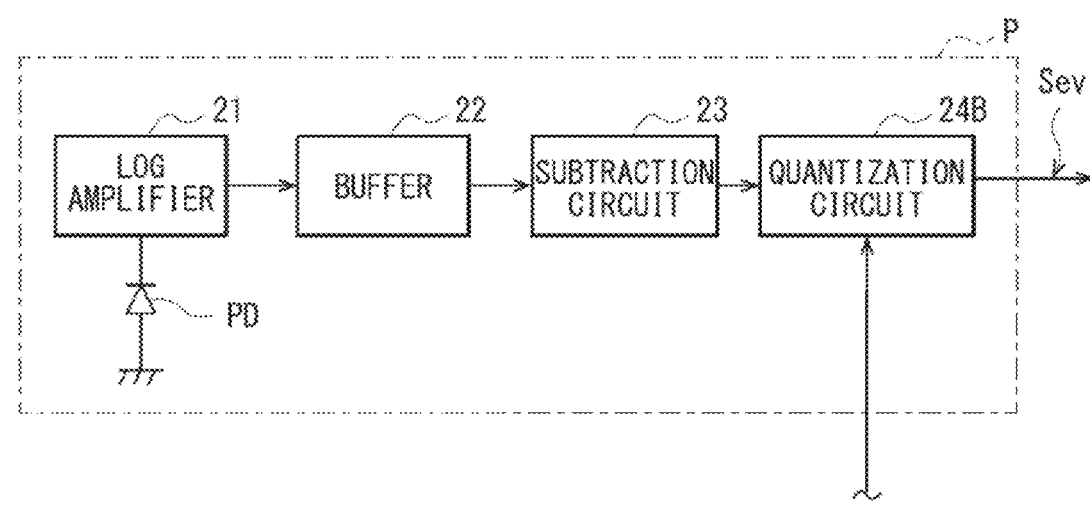
FIG. 12 is a block diagram illustrating a configuration example of a pixel according to another modification example.

FIG. 12 illustrates a configuration example of the pixel P in the pixel array 11B. The pixel P includes a quantization circuit 24B. The quantization circuit 24B determines whether or not the received light amount has increased by the predetermined amount or more, or determines whether or not the received light amount has decreased by the predetermined amount or more, for example, on the basis of an instruction from the control unit 14. Specifically, in the sensor device 1B, the period T having a predetermined time length is repeatedly set, as in the case of Modification Example 1 (FIG. 8). Further, in a certain period T, the quantization circuit 24B determines whether or not the received light amount has increased by the predetermined amount or more on the basis of an instruction from the control unit 14. Further, in a certain period T, the quantization circuit 24B determines whether or not the received light amount has decreased by the predetermined amount or more on the basis of an instruction from the control unit 14. Each time the period T elapses, the quantization circuit 24B alternately performs an operation of determining whether or not the received light amount has increased by the predetermined amount or more and an operation of determining whether or not the received light amount has decreased by the predetermined amount or more.

Figure 13:
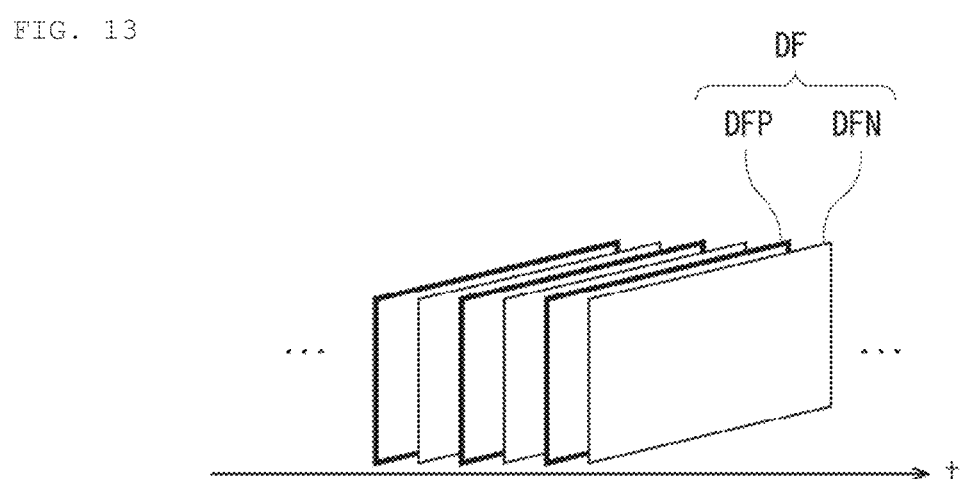
FIG. 13 is an explanatory diagram illustrating an operation example of a pre-processing unit according to another modification example.

FIG. 13 schematically illustrates a data format of the processing information INF. The output controller 39 generates the frame data DF, on the basis of the multiple feature value signals SB in a certain period T. The frame data DF includes frame data DFP and DFN. The output controller 39 alternately generates the frame data DFP and the frame data DFN each time the period T elapses. Specifically, the output controller 39 generates the frame data DFP in the period T in which the multiple pixels P perform the operation of determining whether or not the received light amount has increased by the predetermined amount or more, and the output controller 39 generates the frame data DEN in the period T in which the multiple pixels P perform the operation of determining whether or not the received light amount has decreased by the predetermined amount or more.

Modification Example 3

In the above-described embodiment, the setting circuit 35 of the neuron circuit 30A (FIG. 3) sets the four weighting factors W to be used in the synapse circuit 31 and the threshold TH to be used in the LIF circuit 32, by performing the learning process on the basis of the four event signals Sev and the feature value signal SA. In addition, the setting circuit 35 of the neuron circuit 30B sets the four weighting factors W to be used in the synapse circuit 31 and the threshold TH to be used in the LIF circuit 32, by performing the learning process on the basis of the four feature value signals SA and the feature value signal SB. However, the present disclosure is not limited thereto.

Figure 14:
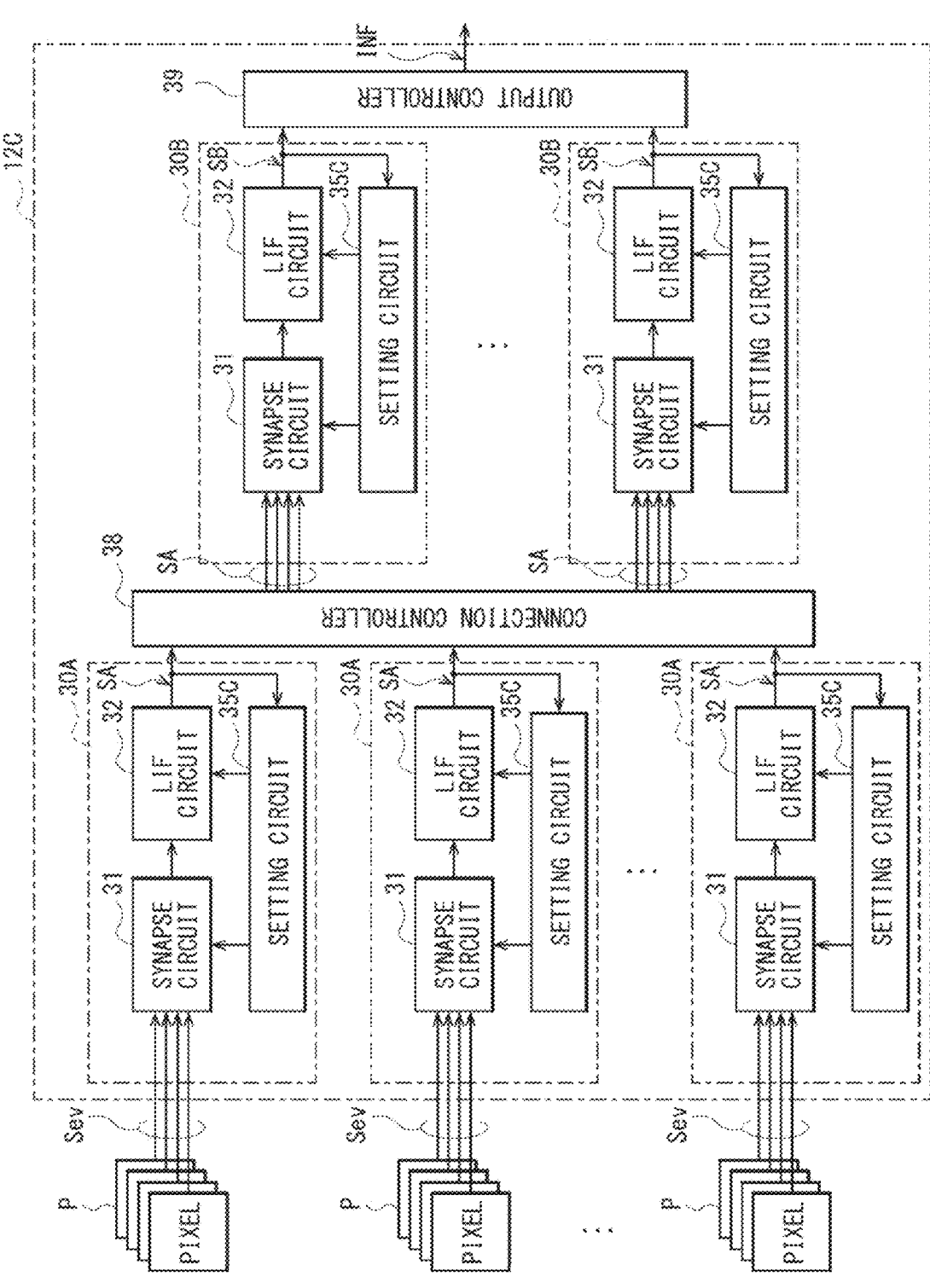
FIG. 14 is a block diagram illustrating a configuration example of a pre-processing unit according to another modification example.

For example, as in a pre-processing unit 12C illustrated in FIG. 14, a setting circuit 35C of the neuron circuit 30A may set the four weighting factors W to be used in the synapse circuit 31 and the threshold TH to be used in the LIF circuit 32 by performing the learning process on the basis of the feature value signal SA. In addition, the setting circuit 35C of the neuron circuit 30B may set the four weighting factors W to be used in the synapse circuit 31 and the threshold TH to be used in the LIF circuit 32 by performing the learning process on the basis of the feature value signal SB.

Figure 15:
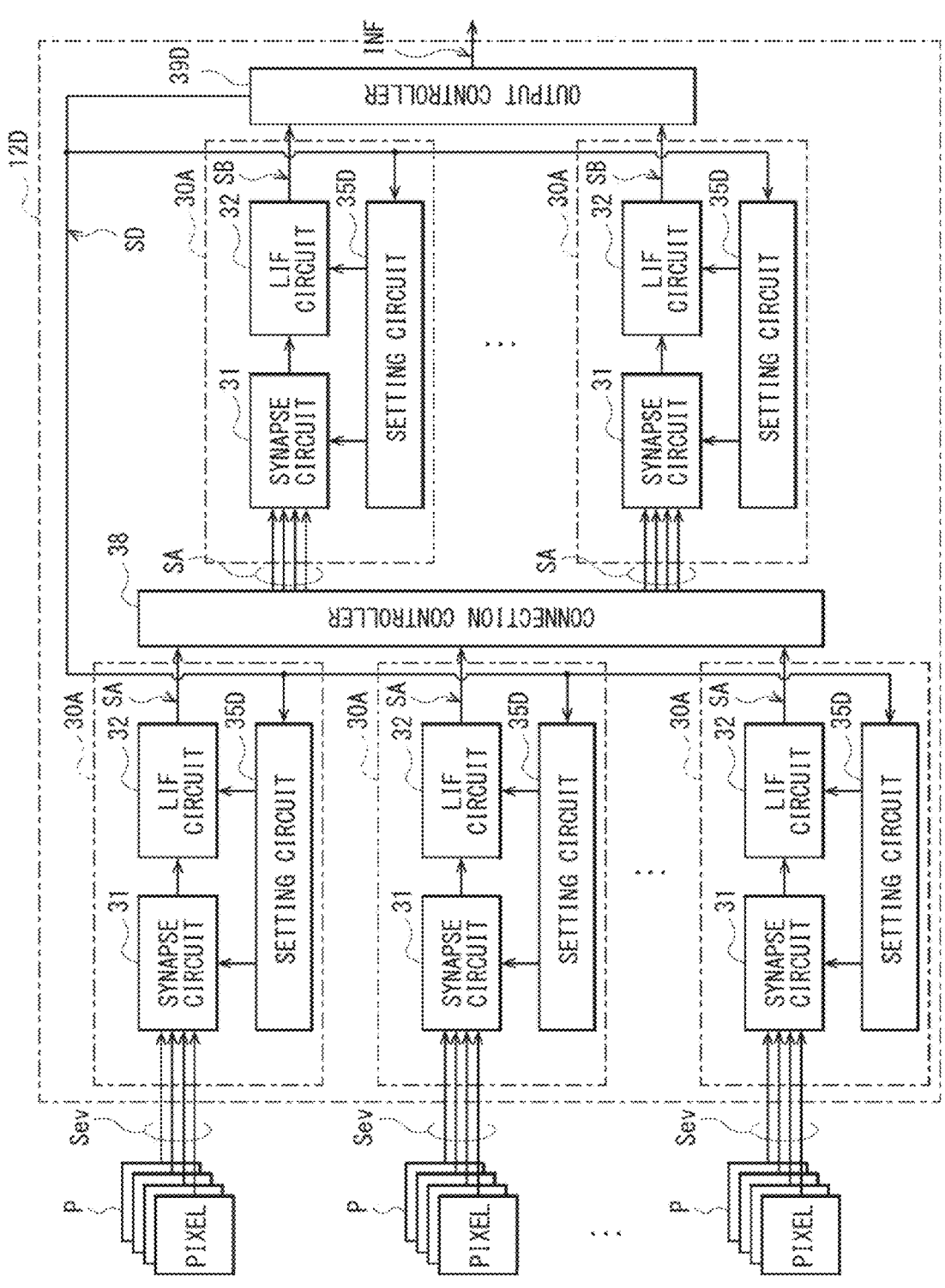
FIG. 15 is a block diagram illustrating a configuration example of a pre-processing unit according to another modification example.

In addition, as in a pre-processing unit 12D illustrated in FIG. 15, an output controller 39D may generate a feature value signal SD on the basis of the multiple feature value signals SB. Further, a setting circuit 35D of each of the neuron circuits 30A and 30B may set the four weighting factors W to be used in the synapse circuit 31 and the threshold TH to be used in the LIF circuit 32 by performing the learning process on the basis of the feature value signal SD.

Modification Example 4

In the above-described embodiment, the subtraction circuit 23 of the pixel P (FIG. 2) includes a sample hold circuit. The sample hold circuit may sample the signal supplied from the buffer 22 on the basis of a reset signal. The present modification example will be described below with some examples.

A sensor device 1E according to the present modification example includes a pixel array 11E and a pre-processing unit 12E, as in the sensor device 1 (FIG. 1) according to the above-described embodiment.

Figure 16:
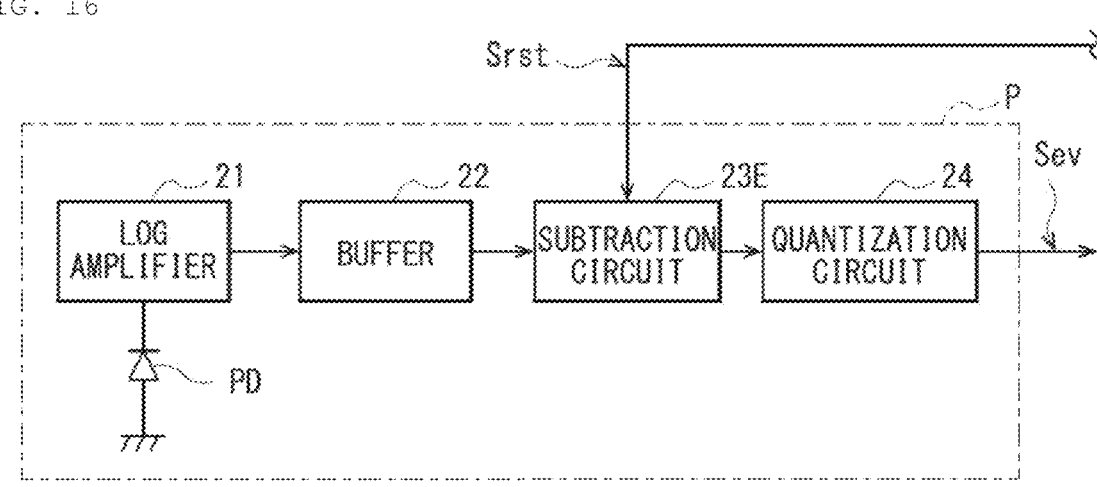
FIG. 16 is a block diagram illustrating a configuration example of a pixel according to another modification example.

FIG. 16 illustrates a configuration example of the pixel P in the pixel array 11E. The pixel P includes a subtraction circuit 23E. The subtraction circuit 23E includes a sample hold circuit. The subtraction circuit 23E samples the signal supplied from the buffer 22 on the basis of a reset signal Srst, and holds the sampled signal. Further, the subtraction circuit 23E thereafter outputs a signal corresponding to a difference between the signal supplied from the buffer 22 and the held signal.

Figure 17:
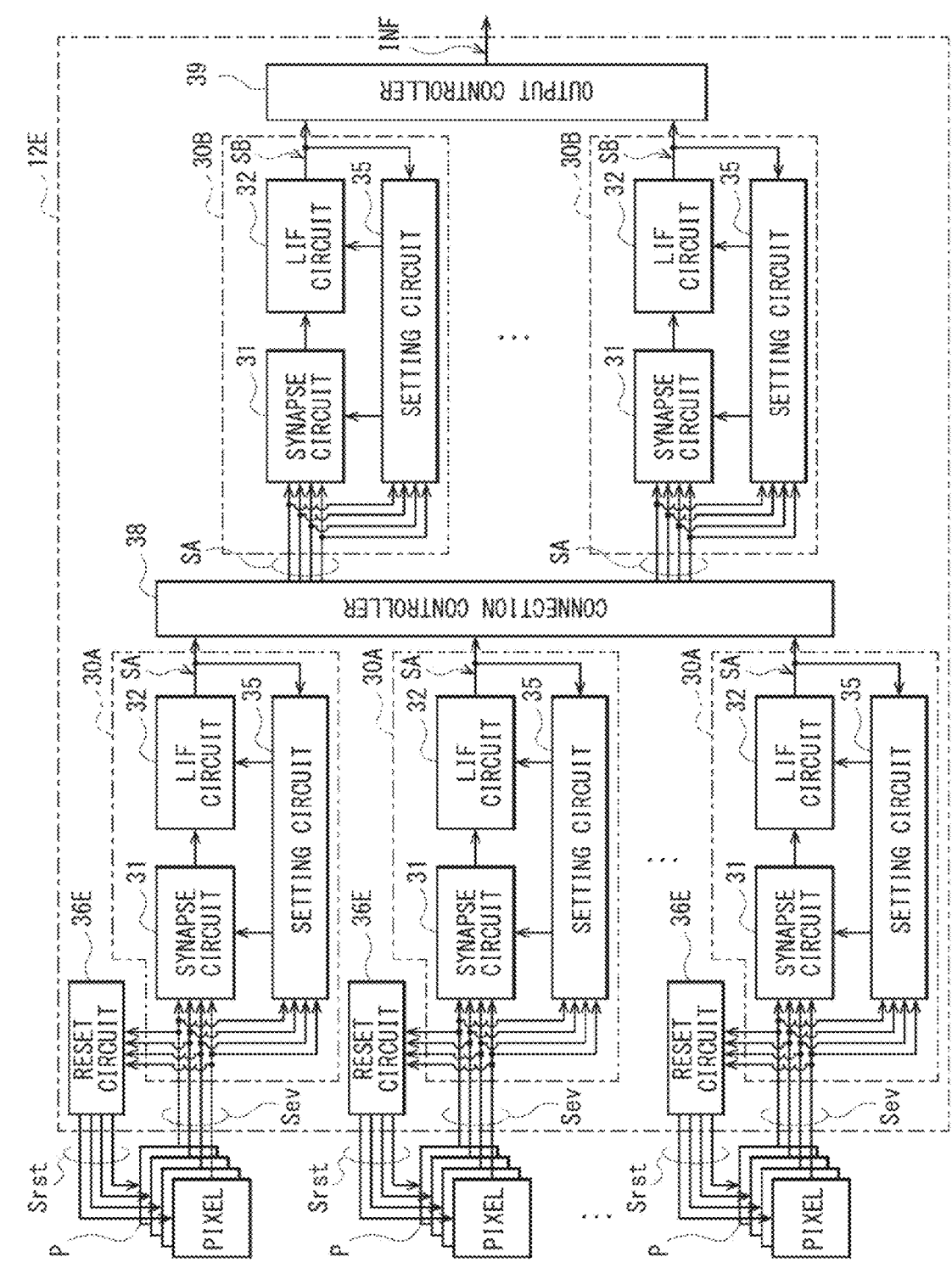
FIG. 17 is a block diagram illustrating a configuration example of a pre-processing unit according to another modification example.

FIG. 17 illustrates a configuration example of the pre-processing unit 12E. The pre-processing unit 12E includes multiple reset circuits 36E. The multiple reset circuits 36E are provided to correspond to the respective multiple neuron circuits 30A. The reset circuit 36E is configured to generate the reset signal Srst on the basis of the four event signals Sev supplied from the four pixels P in this example. Specifically, in a case where the event signal Sev of a certain pixel P among the four pixels P is set to a high level, the reset circuit 36E uses the reset signal Srst to control the subtraction circuit 23E of the pixel P to perform sampling. Thus, the subtraction circuit 23E of the pixel P samples the inputted signal and holds the sampled signal each time an event occurs in the pixel P. Further, the subtraction circuit 23E thereafter outputs a signal corresponding to a difference between the inputted signal and the held signal. Here, the reset circuit 36E corresponds to a specific example of a "control circuit" in the present disclosure.

Another sensor device 1F according to the present modification example includes the pixel array 11E and a pre-processing unit 12F, as in the sensor device 1 (FIG. 1) according to the above-described embodiment.

Figure 18:
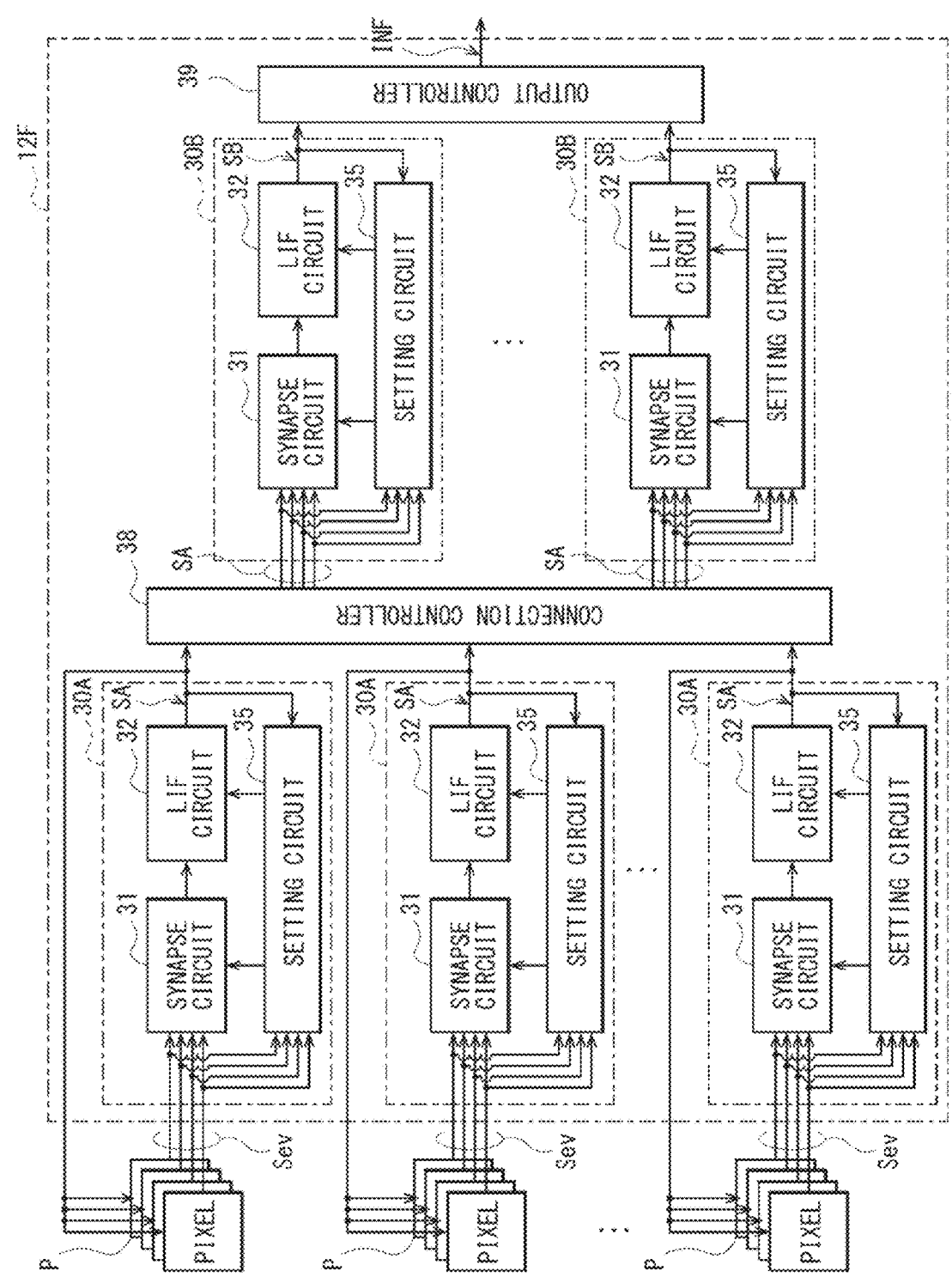
FIG. 18 is a block diagram illustrating a configuration example of a pre-processing unit according to another modification example.

FIG. 18 illustrates a configuration example of the pre-processing unit 12F. In the pre-processing unit 12F, the neuron circuit 30A supplies the generated feature value signal SA, as the reset signal Srst, to the four pixels P that generate the four event signals Sev to be supplied to the neuron circuit 30A. Thus, the subtraction circuit 23E of the pixel P samples the inputted signal and holds the sampled signal each time a pulse signal occurs in the feature value signal SA. Further, the subtraction circuit 23E thereafter outputs a signal corresponding to a difference between the inputted signal and the held signal.

Modification Example 5

Figures 19, 20:
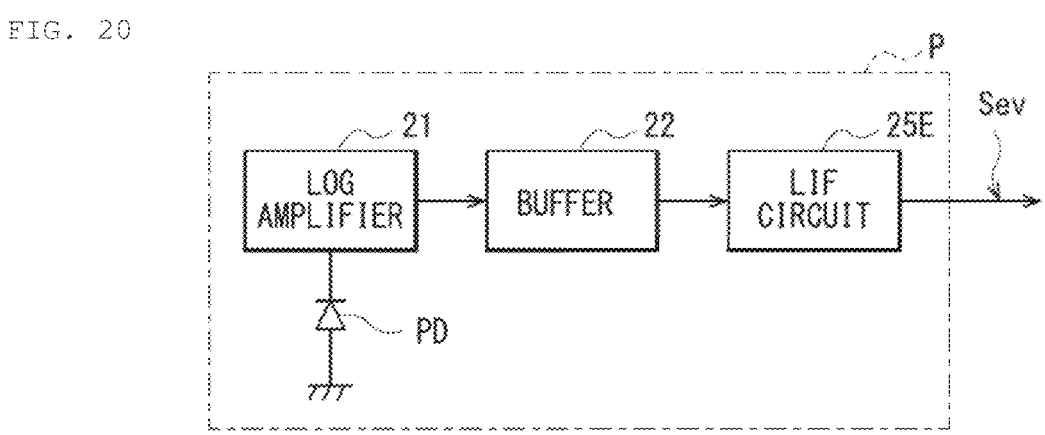
FIG. 19 is a block diagram illustrating a configuration example of a pixel according to another modification example.
FIG. 20 is a block diagram illustrating a configuration example of a pixel according to another modification example.

In the above-described embodiment, the pixel P (FIG. 2) includes one photodiode PD, but the present disclosure is not limited thereto. Alternatively, for example, as illustrated in FIG. 19, the pixel P may include multiple photodiodes PD (four photodiodes PDA, PDB, PDC, and PDD in this example). Each E of the multiple photodiodes PD has the anode grounded, and the cathode coupled to the LOG amplifier 21. This makes it possible to increase light receiving sensitivity of the pixel P.

Modification Example 6

In the above-described embodiment, the pixel P (FIG. 2) includes the subtraction circuit 23 and the quantization circuit 24, but the present disclosure is not limited thereto. Some examples are given below.

FIG. 20 illustrates a configuration example of the pixel P according to the present modification example. The pixel P includes a LIF circuit 25E. That is, although the subtraction circuit 23 and the quantization circuit 24 are provided as illustrated in FIG. 2 in the above-described embodiment, instead of these, the LIF circuit 25E is provided in the pixel P according to the present modification example. The LIF circuit 25E is configured to generate the event signal Sev on the basis of the signal supplied from the buffer 22. The LIF circuit 25E has a configuration similar to that of the LIF circuit 32 (FIG. 4) according to the above-described embodiment. The threshold TH in the LIF circuit 25E is set to, for example, a predetermined value.

Figure 21:
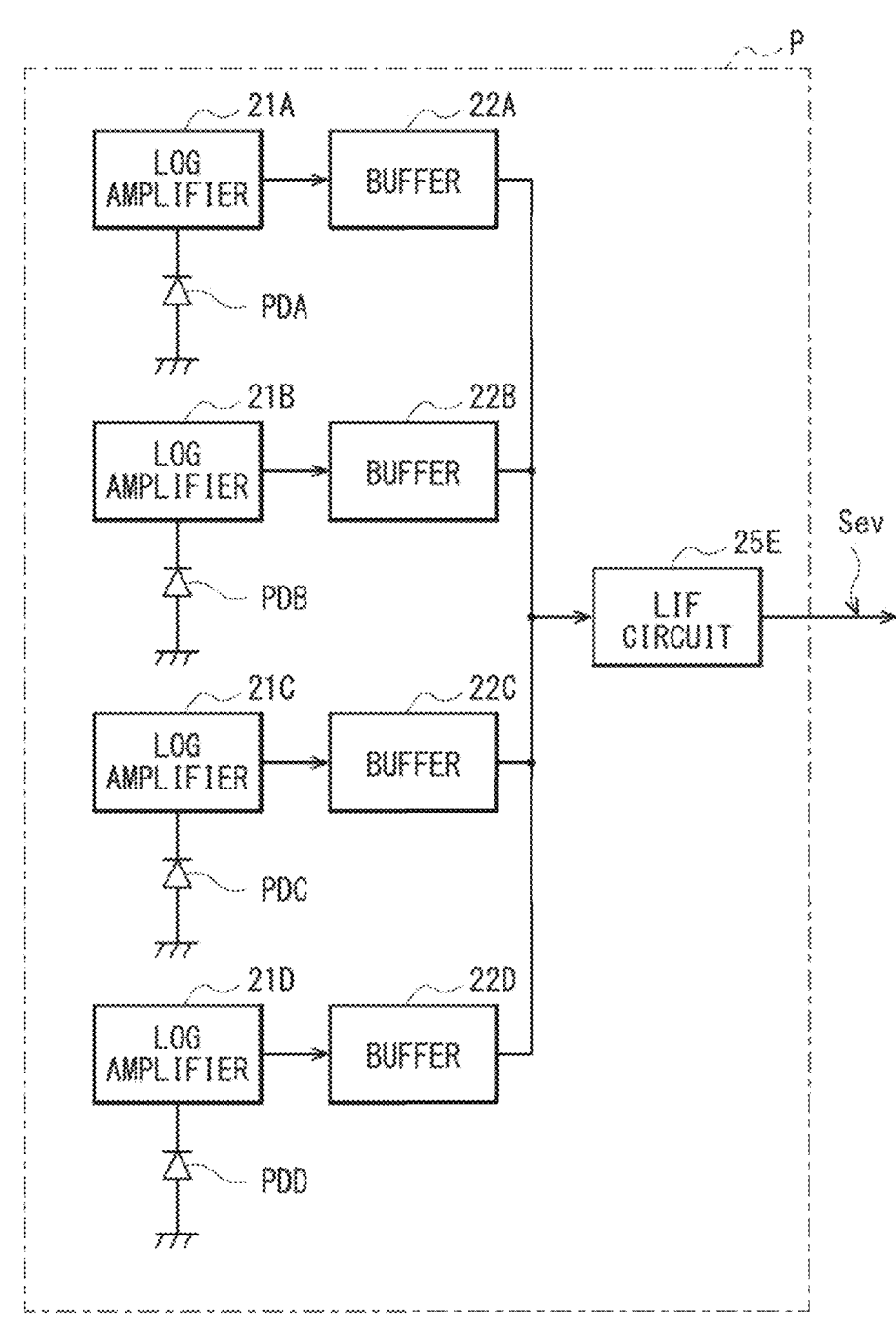
FIG. 21 is a block diagram illustrating a configuration example of a pixel according to another modification example.

FIG. 21 illustrates a configuration example of another pixel P according to the present modification example. The pixel P includes multiple photodiodes PD (the four photodiodes PDA, PDB, PDC, and PDD in this example), multiple LOG amplifiers 21 (four LOG amplifiers 21A, 21B, 21C, and 21D in this example), multiple buffers 22 (four buffers 22A, 22B, 22C, and 22D in this example), and the LIF circuit 25E. For example, the photodiode PDA has the anode grounded, and the cathode coupled to the input terminal of the LOG amplifier 21A. The LOG amplifier 21A has the input terminal coupled to the cathode of the photodiode PDA, and the output terminal coupled to the input terminal of the buffer 22A. The input terminal of the buffer 22A is coupled to the output terminal of the LOG amplifier 21A. The same applies to the photodiode PDB, the LOG amplifier 21B, and the buffer 22B. The same applies to the photodiode PDC, the LOG amplifier 21C, and the buffer 22C. The same applies to the photodiode PDD, the LOG amplifier 21D, and the buffer 22D. The output terminals of the four buffers 22A to 22D are coupled to each other and coupled to the input terminal of the LIF circuit 25E. For example, in a case where the four buffers 22A to 22D are source follower circuits using N-type MOS (Metal Oxide Semiconductor) transistors, the buffer 22 having the highest input voltage of the four buffers 22A to 22D outputs a signal. The LIF circuit 25E generates the event signal Sev on the basis of the signal supplied from the four buffers 22A to 22D.

Figure 22:
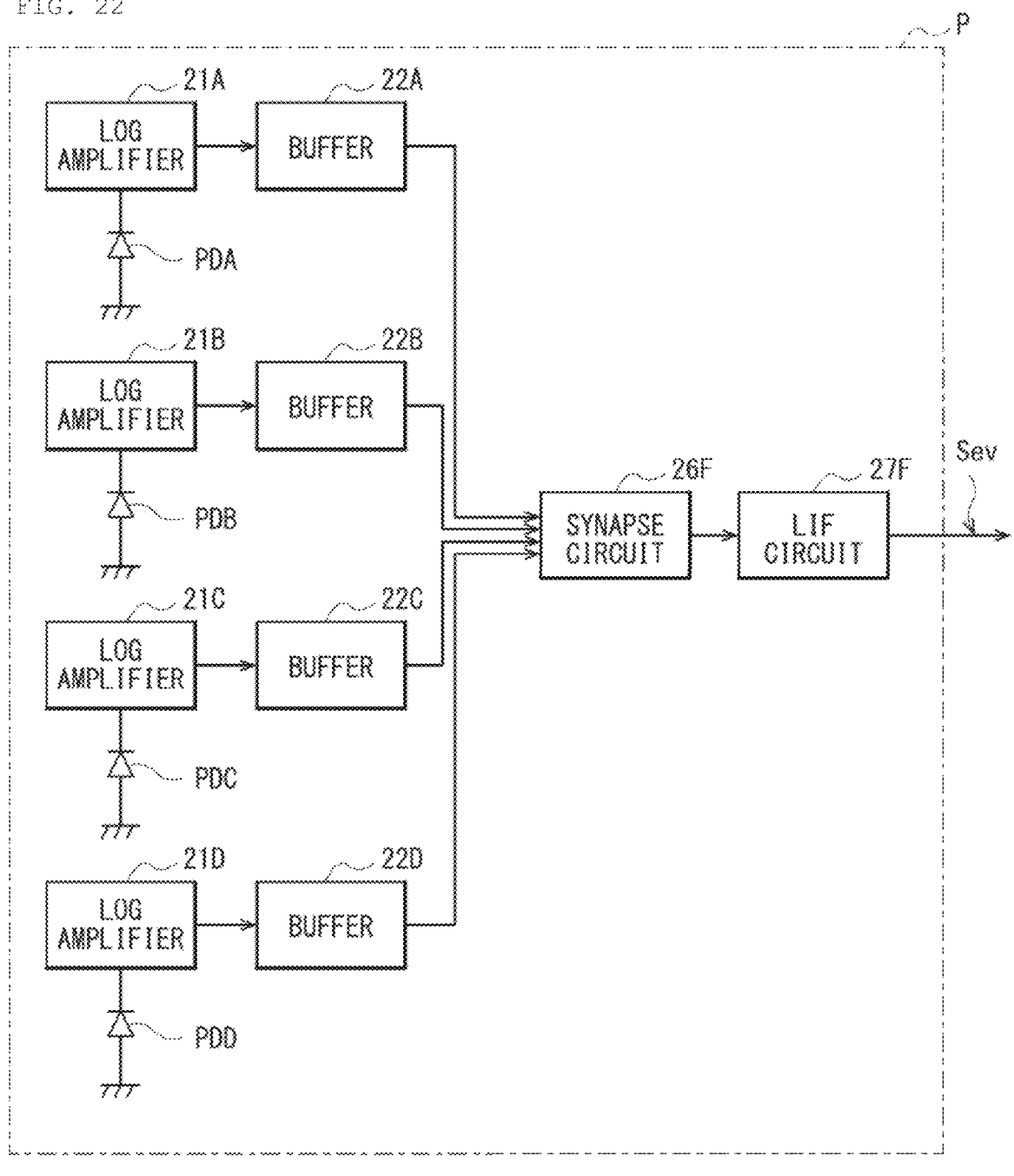
FIG. 22 is a block diagram illustrating a configuration example of a pixel according to another modification example.

FIG. 22 illustrates a configuration example of another pixel P according to the present modification example. The pixel P includes multiple photodiodes PD (the four photodiodes PDA, PDB, PDC, and PDD in this example), multiple LOG amplifiers 21 (the four LOG amplifiers 21A, 21B, 21C, and 21D in this example), multiple buffers 22 (the four buffers 22A, 22B, 22C, and 22D in this example), a synapse circuit 26F, and a LIF circuit 27F.

In this example, the synapse circuit 26F is configured to perform, on the basis of the four signals supplied from the four buffers 22A to 22D, the weighted addition process using four weighting factors W corresponding to these respective four signals. These weighting factors W are set to, for example, predetermined values. The LIF circuit 27F is configured to generate the event signal Sev on the basis of a signal supplied from the synapse circuit 26F. The LIF circuit 27F has a configuration similar to that of the LIF circuit 32 (FIG. 4) according to the above-described embodiment. The threshold TH in the LIF circuit 27F is set to, for example, a predetermined value.

Modification Example 7

In the above-described embodiment, all of the pixels P in the pixel array 11 are operated. but the present disclosure is not limited thereto. It may be possible to selectively operate a portion of all of the pixels P. A sensor device 1G according to the present modification example will be described in detail below.

Figure 23:
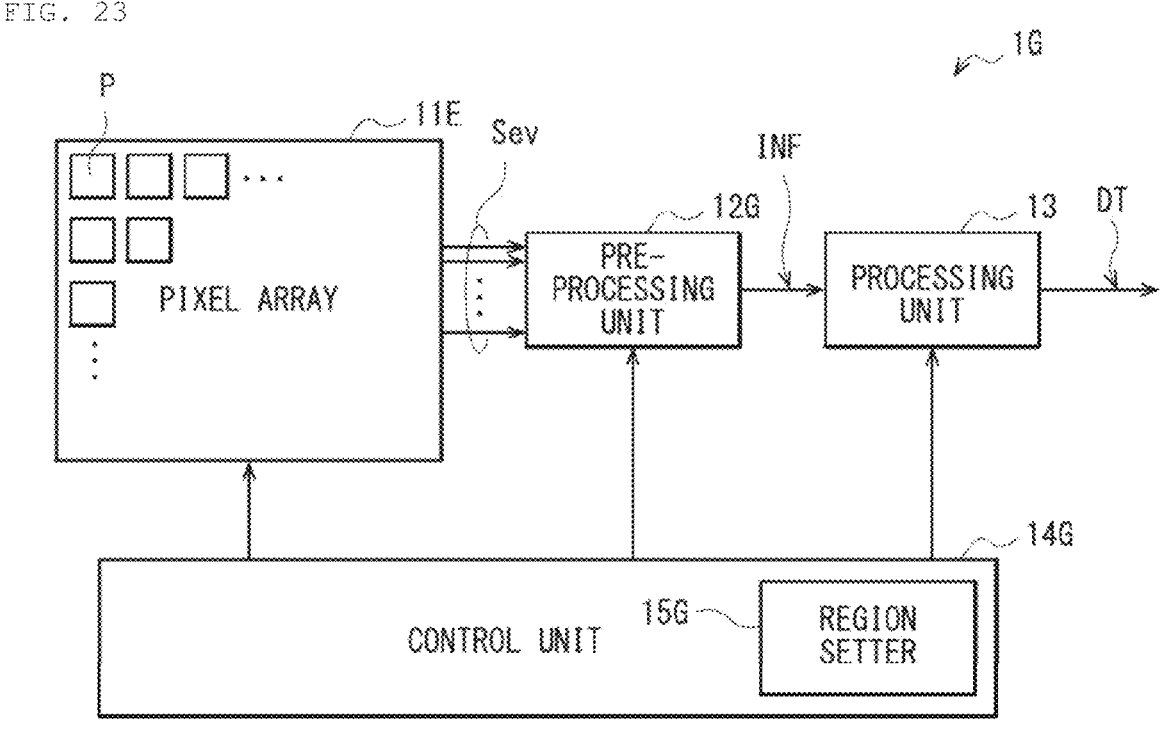
FIG. 23 is a block diagram illustrating a configuration example of a sensor device according to another modification example.

FIG. 23 illustrates a configuration example of the sensor device 1G. The sensor device 1G includes the pixel array 11E, a pre-processing unit 12G, and a control unit 14G.

The pixel P of the pixel array 11E includes the subtraction circuit 23E, as illustrated in FIG. 16. The subtraction circuit 23E includes a sample hold circuit. The subtraction circuit 23E samples the signal supplied from the buffer 22 on the basis of the reset signal Srst, and holds the sampled signal. Further, the subtraction circuit 23E thereafter outputs a signal corresponding to a difference between the signal supplied from the buffer 22 and the held signal.

Figure 24:
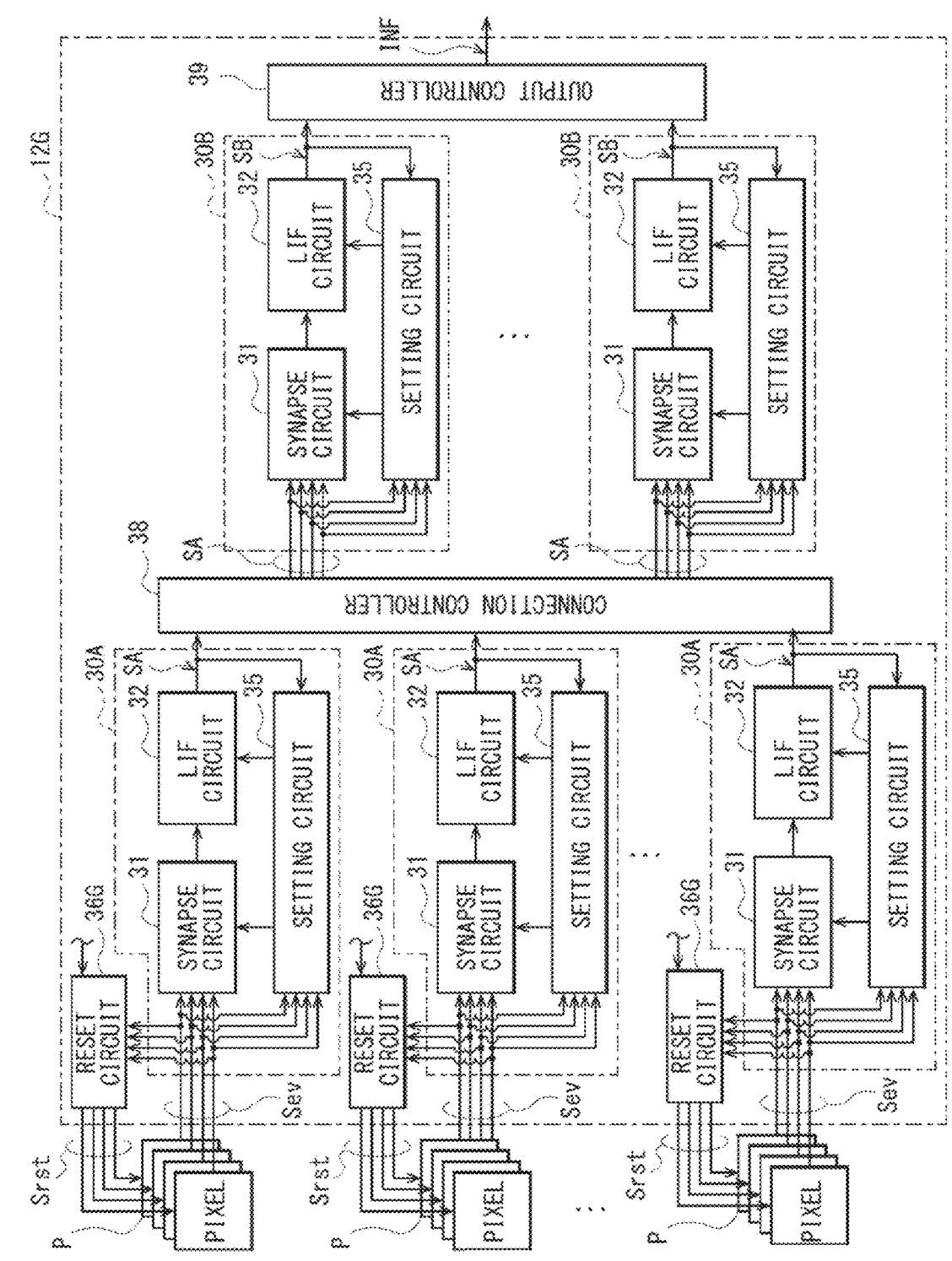
FIG. 24 is a block diagram illustrating a configuration example of a pre-processing unit illustrated in FIG. 23.

FIG. 24 illustrates a configuration example of the pre-processing unit 12G. The pre-processing unit 12G includes multiple reset circuits 36G. The multiple reset circuits 36G are provided to correspond to the respective multiple neuron circuits 30A. The reset circuit 36G is configured to generate the reset signal Srst on the basis of the four event signals Sev supplied from the four pixels P in this example, as with the reset circuit 36E (FIG. 17). In addition, the reset circuit 36G is able to generate the reset signal Srst on the basis of a control signal supplied from the control unit 14G. Specifically, on the basis of the control signal supplied from the control unit 14G, the reset circuit 36G uses the reset signal Srst to cause the subtraction circuit 23E of each of these four pixels P to keep the operation of sampling the inputted signal. The subtraction circuit 23E of each of these four pixels P keeps the operation of sampling the inputted signal on the basis of the reset signal Srst. Accordingly, in the subtraction circuit 23E of the pixel P, the inputted signal and the held signal are equal to each other, and the subtraction circuit 23E thus outputs a signal of substantially zero corresponding to the difference between these signals. Therefore, the quantization circuit 24 (FIG. 16) detect no event, and thus keeps the event signal Sev at, for example, a low level. In this manner, the reset circuit 36G is able to refrain from operating these four pixels P on the basis of an instruction from the control unit 14G. Here, the reset circuit 36G corresponds to a specific example of the "control circuit" in the present disclosure.

The control unit 14G (FIG. 23) is configured to control the operation of the sensor device 1G by supplying control signals to the pixel array 11E, the pre-processing unit 12G, and the processing unit 13. The control unit 14G includes a region setter 15G. The region setter 15G is configured to set a region where the pixel P is to be operated, of a sensor region in the pixel array 11E. The control unit 14G supplies a control signal to each of the multiple reset circuits 36G of the pre-processing unit 12G, on the basis of the region set by the region setter 15G.

Figure 25:
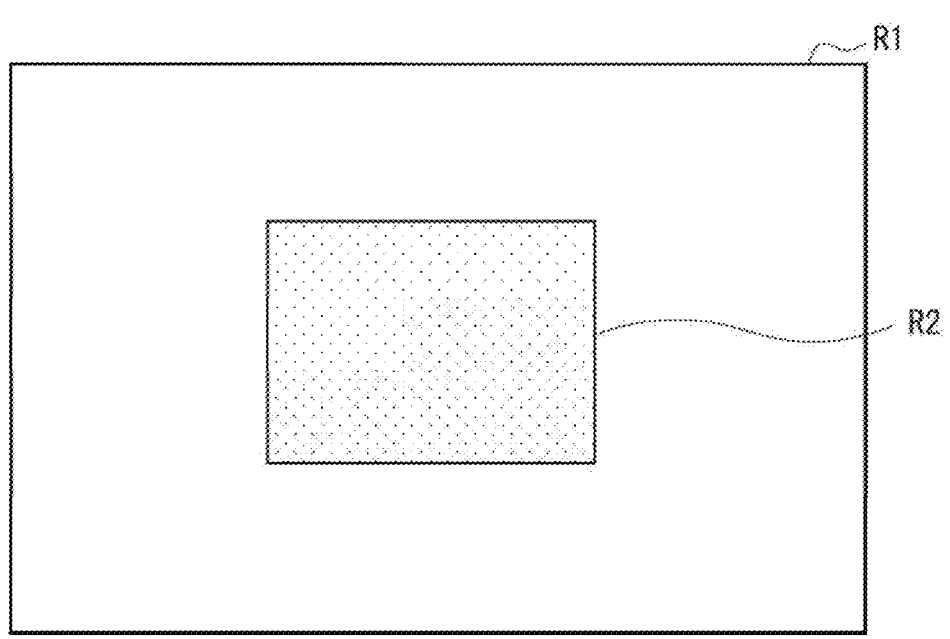
FIG. 25 is an explanatory diagram illustrating an operation example of the sensor device illustrated in FIG. 23.

Thus, the sensor device 1G is able to selectively operate a portion of all of the pixels P. For example, the sensor device 1G may operate the pixel P corresponding to a region R2 of a sensor region R1 in the pixel array 11E, and refrain from operating the pixel P corresponding to a region other than the region R2, as illustrated in FIG. 25. It is to be noted that, although one region R2 is provided in this example, the present disclosure is not limited thereto, and multiple regions R2 may be provided. Consequently, the sensor device 1G is able to increase, for example, operation efficiency.

Modification Example 8

In the above-described embodiment, the event signal Sev generated by the pixel P is directly inputted to the neuron circuit 30A, but the present disclosure is not limited thereto, and the event signal Sev may be delayed. A sensor device 1H according to the present modification example will be described in detail below.

Figure 26:
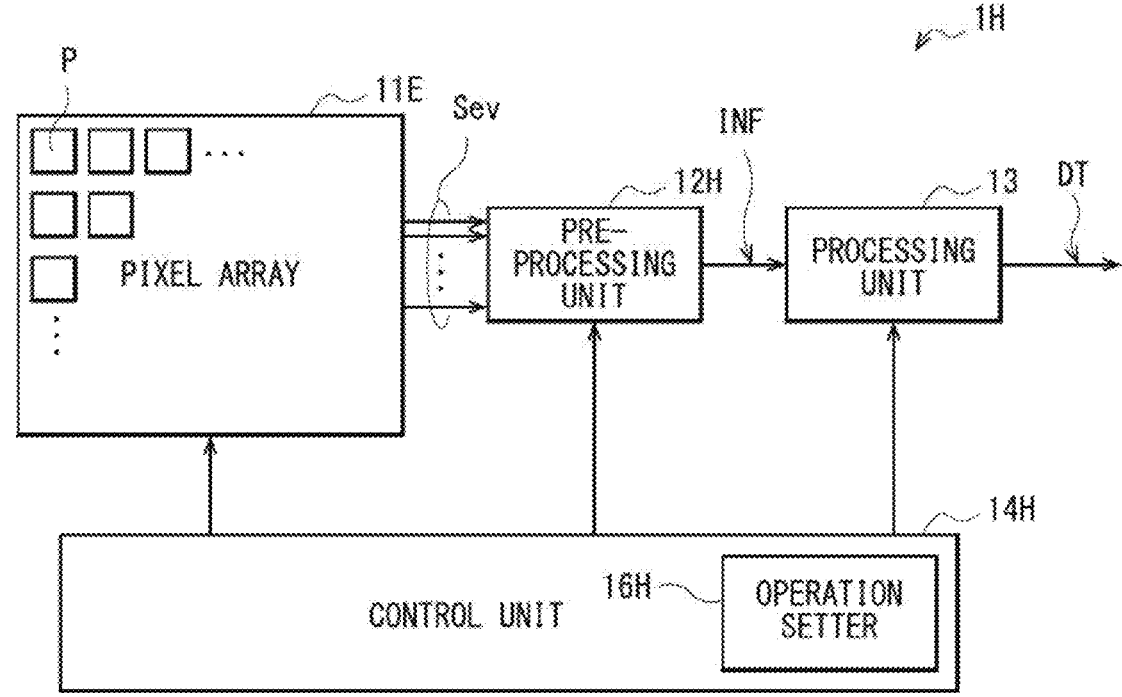
FIG. 26 is a block diagram illustrating a configuration example of a sensor device according to another modification example.

FIG. 26 illustrates a configuration example of the sensor device 1H. The sensor device 1H includes the pixel array 11E, a pre-processing unit 12H, and a control unit 14H.

The pixel P of the pixel array 11E includes the subtraction circuit 23E, as illustrated in FIG. 16. The subtraction circuit 23E includes a sample hold circuit. The subtraction circuit 23E samples the signal supplied from the buffer 22 on the basis of the reset signal Srst, and holds the sampled signal. Further, the subtraction circuit 23E thereafter outputs a signal corresponding to a difference between the signal supplied from the buffer 22 and the held signal.

Figure 27:
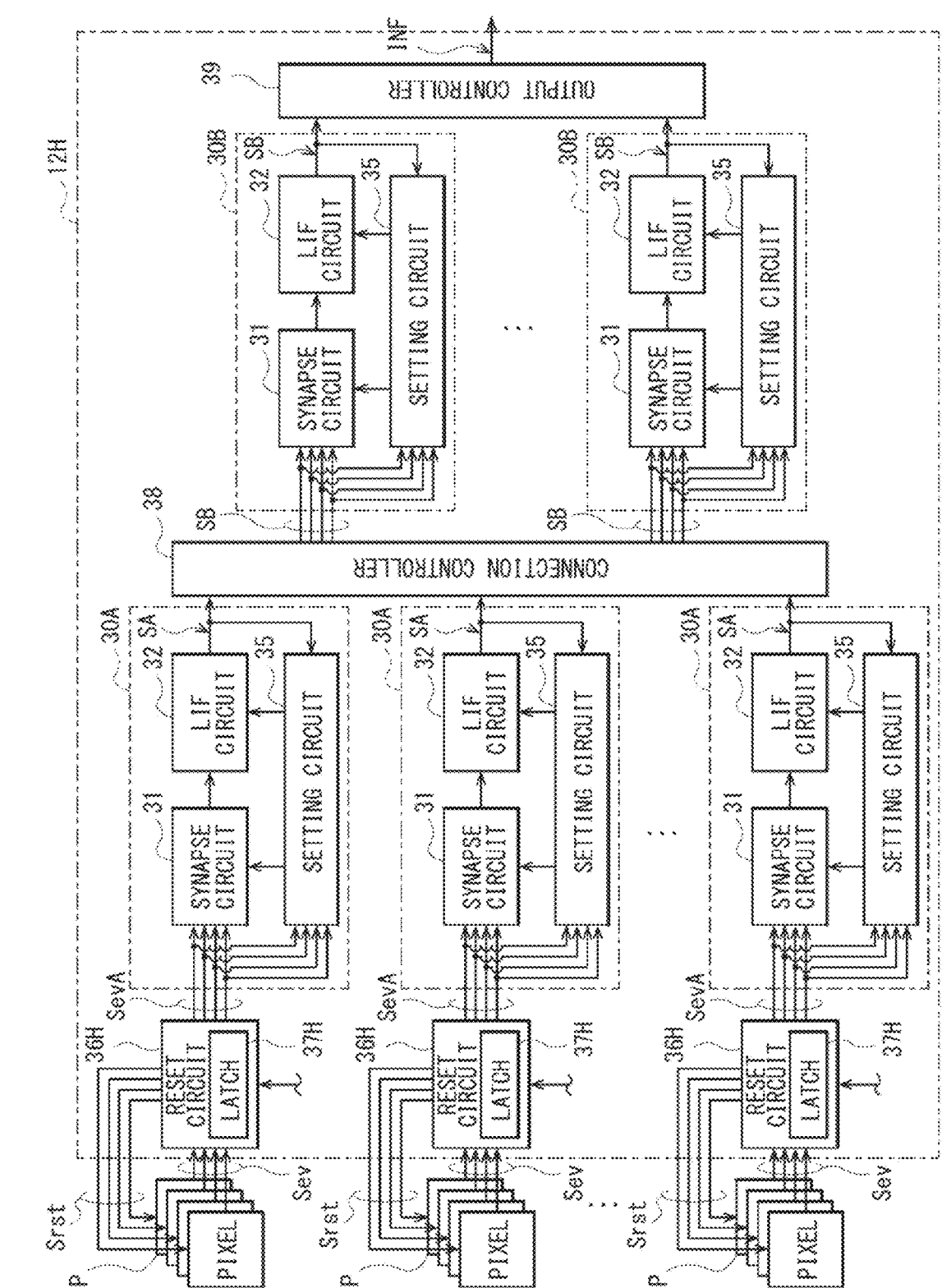
FIG. 27 is a block diagram illustrating a configuration example of a pre-processing unit illustrated in FIG. 26.
Figure 23:
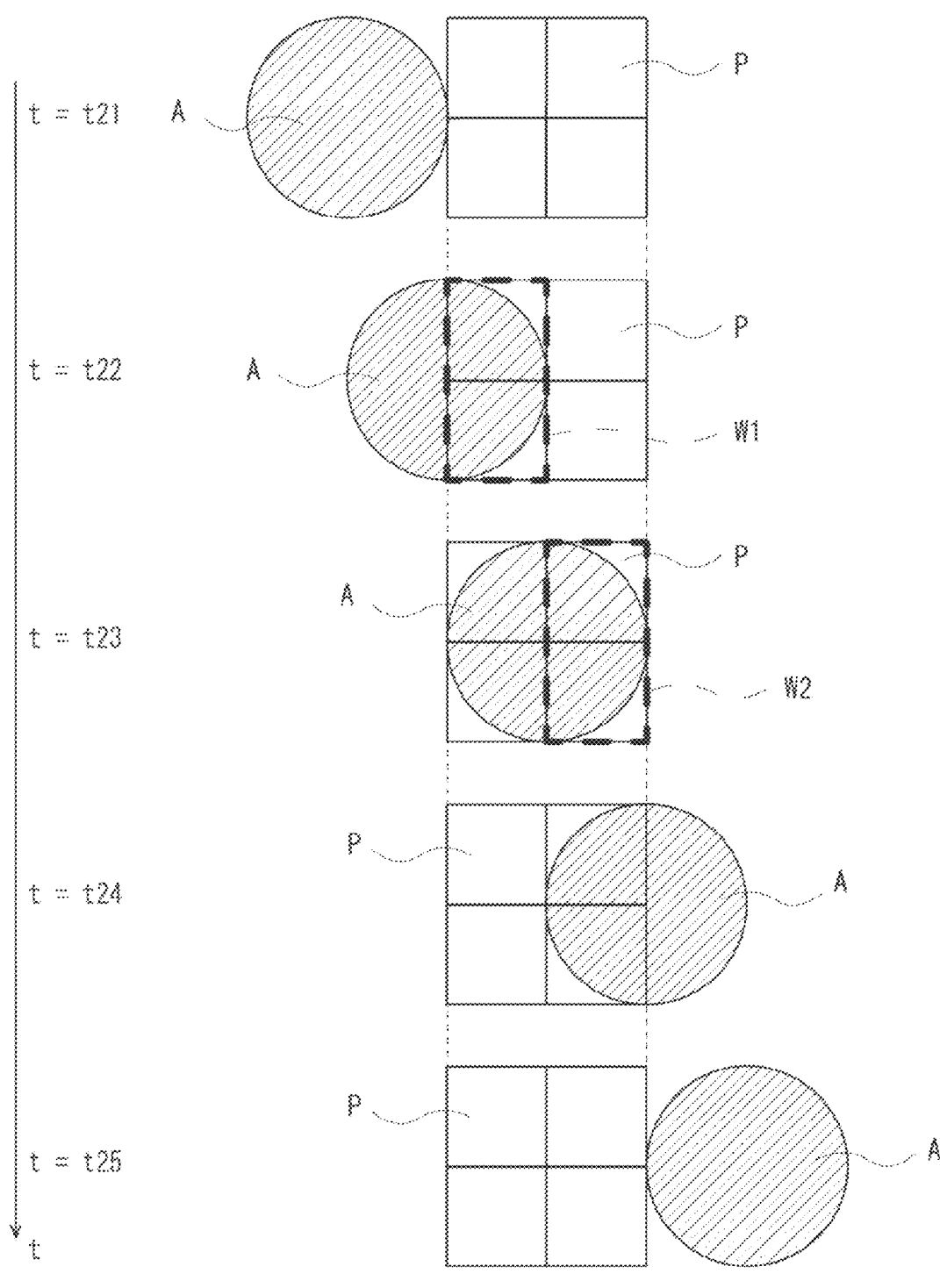

FIG. 27 illustrates a configuration example of the pre-processing unit 12H. The pre-processing unit 12H includes multiple reset circuits 36H. In this example, in the pre-processing unit 12H, the period T having a predetermined time length is repeatedly set, as in the case of Modification Example 1 (FIG. 8).

The multiple reset circuits 36H are provided to correspond to the respective multiple neuron circuits 30A. The reset circuit 36H is configured to generate the reset signal Srst on the basis of the four event signals Sev supplied from the four pixels P in this example, as with the reset circuit 36E (FIG. 17). In addition, the reset circuit 36H may generate four event signals SevA by delaying a portion of the four event signals Sev on the basis of a control signal supplied from the control unit 14H. Specifically, the reset circuit 36H may include a latch 37H, and use the latch 37H to selectively hold a portion of the four event signals Sev for a time corresponding to the period T, on the basis of the control signal supplied from the control unit 14H. The reset circuit 36H is thus able to delay the event signal Sev by a time corresponding to the period T. The neuron circuit 30A generates the feature value signal SA on the basis of the four event signals SevA supplied from the reset circuit 36H. This enables the sensor device 1H to effectively detect the detection target in a case where the detection target moves, as described below. Here, the reset circuit 36H corresponds to a specific example of the "control circuit" in the present disclosure.

The control unit 14H is configured to control the operation of the sensor device 1H by supplying control signals to the pixel array 11E, the pre-processing unit 12H, and the processing unit 13. The control unit 14H includes an operation setter 16H. For example, in a case where a movement direction of the detection target of the sensor device 1H is predicted, the operation setter 16H is configured to control the operation of the reset circuit 36H in accordance with the movement direction.

FIG. 28 illustrates the movement of an image A of the detection target on a sensor surface of the pixel array 11E. In this example, the image A is moving rightward. The four pixels P are arranged in two rows and two columns in this example. The image A crosses a region where the four pixels P are arranged. At a timing t22, the right half of the image A overlaps a region of the two pixels P on the left side among the four pixels P. Therefore, for example, at the timing t22, the two pixels P on the left side output pulse signals as the event signals Sev. Further, at a timing t23 after elapse of a time corresponding to the period T from the timing t22, the right half of the image A overlaps a region of the two pixels P on the right side among the four pixels P. Therefore, for example, at the timing t24, the two pixels P on the right side output pulse signals as the event signals Sev.

In this example, because the image A moves rightward, the four event signals SevA are generated by delaying the event signals Sev supplied from the two pixels P on the left side among the four pixels P, on the basis of instructions from the reset circuit 36H and the control unit 14H. In the example of FIG. 28, the four event signals Sev are the event signals Sev generated by the two pixels P on the left side at the timing t22, and the event signals Sev generated by the two pixels P on the right side at the timing t23. The neuron circuit 30A generates the feature value signal SA on the basis of the four event signals SevA. In this example, because the four event signals SevA include pulse signals in the period T, it is easier for the feature value signal SA to include a pulse signal. Consequently, the sensor device 1H is able to effectively detect a moving detection target.

Described in this example is the case where the image A moves rightward. For example, in a case where the image A moves leftward, the reset circuit 36H generates the four event signals SevA by delaying the event signals Sev supplied from the two pixels P on the right side among the four pixels P, on the basis of an instruction from the control unit 14H. In addition, in a case where the image A moves upward, the reset circuit 36H generates the four event signals SevA by delaying the event signals Sev supplied from the two pixels P on the lower side among the four pixels P, on the basis of an instruction from the control unit 14H. In addition, in a case where the image A moves downward, the reset circuit 36H generates the four event signals SevA by delaying the event signals Sev supplied from the two pixels P on the upper side among the four pixels P, on the basis of an instruction from the control unit 14H. In addition, in a case where the image A has a slow moving speed, the reset circuit 36H increases a delay amount of the event signal Sev on the basis of an instruction from the control unit 14H.

In this manner, the sensor device 1H is able to effectively detect a moving detection target. Consequently, the sensor device 1H is able to effectively analyze, for example, optical flow. The sensor device 1H is also able to effectively analyze, for example, blinking frequency of the detection target.

Modification Example 9

In the above-described embodiment, the LIF circuit 32 uses one threshold TH to generate one feature value signal, but the present disclosure is not limited thereto. Alternatively, multiple thresholds TH may be used to generate multiple feature value signals. A sensor device 1I according to the present modification example will be described in detail below.

The sensor device 1I according to the present modification example includes the pixel array 11 and a pre-processing unit 12I, as in the sensor device 1 (FIG. 1) according to the above-described embodiment.

Figure 29:
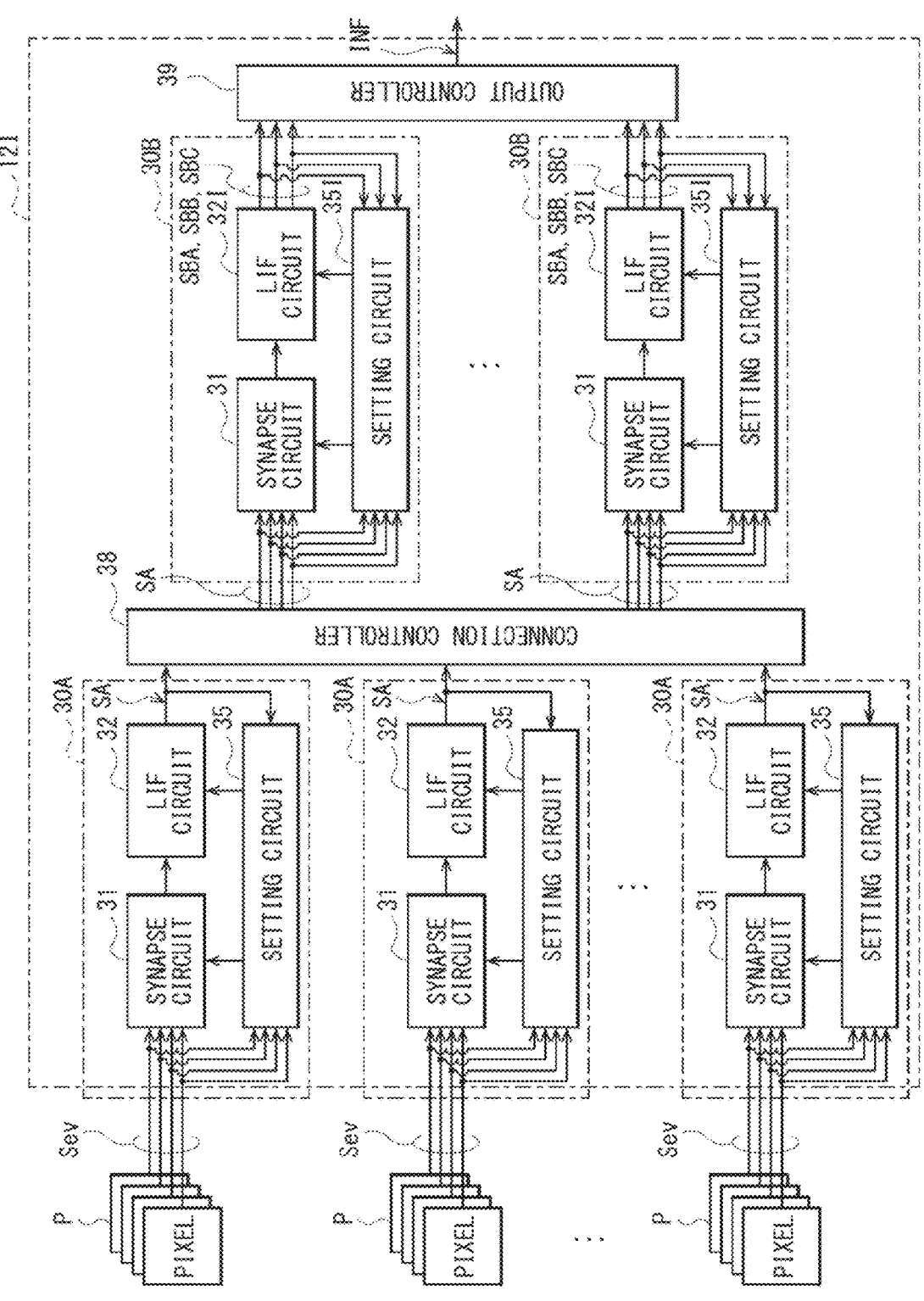
FIG. 29 is a block diagram illustrating a configuration example of a pre-processing unit according to another modification example.

FIG. 29 illustrates a configuration example of the pre-processing unit 12I. The pre-processing unit 12E includes the multiple neuron circuits 30B. The neuron circuit 30B is configured to generate multiple feature value signals SB (three feature value signals SBA, SBB, and SBC in this example) on the basis of multiple (four in this example) feature value signals SA supplied from the connection controller 38. The neuron circuit 30B includes a LIF circuit 32I and a setting circuit 35I.

Figure 30:
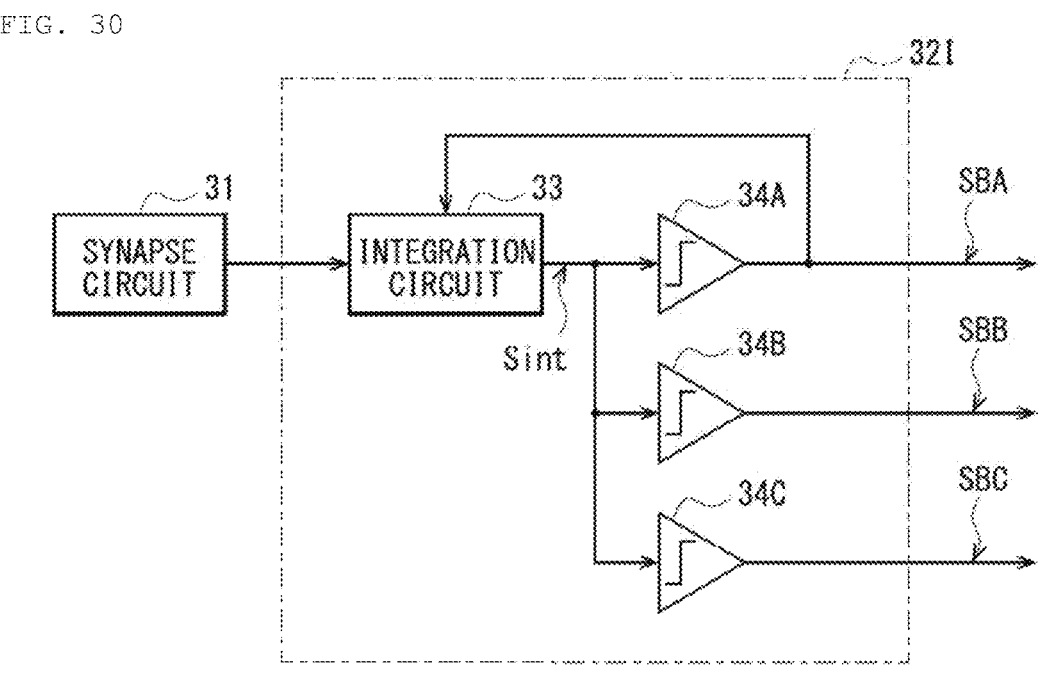
FIG. 30 is a block diagram illustrating a configuration example of a LIF circuit illustrated in FIG. 29.

FIG. 30 illustrates a configuration example of the LIF circuit 32I. The LIF circuit 32I includes three comparison circuits 34A, 34B, and 34C. The comparison circuit 34A is configured to generate the feature value signal SBA by comparing the integration signal Sint supplied from the integration circuit 33 with a threshold THA. The comparison circuit 34B is configured to generate the feature value signal SBB by comparing the integration signal Sint supplied from the integration circuit 33 with a threshold THB. The comparison circuit 34C is configured to generate the feature value signal SBC by comparing the integration signal Sint supplied from the integration circuit 33 with a threshold THC. The threshold THA is set by the setting circuit 35I. The thresholds THB and THC are calculated on the basis of the threshold THA by the following expressions.

$$THB=THA/kb$$

$$THC=THA/kc$$

Here, the parameters kb and kc have a value greater than 1. That is, the thresholds THB and THC are lower than the threshold THA. The parameters kb and kc may be preset to, for example, "2" and "3", respectively. In a case where the number of the comparison circuits 34 is larger, the thresholds TH of the comparison circuits 34 may be set as follows: TAH, THA/2, THA/3, THA/4, THA/5, etc. Alternatively, the parameters kb and kc may be preset to, for example, random values greater than 1. Thus, the threshold THA is greater than the thresholds THB and THC. The integration circuit 33 is able to reset the integration signal Sint on the basis of the feature value signal SBA, which is an output signal of the comparison circuit 34A that operates using the largest threshold THA. Here, the comparison circuits 34A, 34B, and 34C correspond to a specific example of a "second comparison circuit" in the present disclosure. The comparison circuit 34A corresponds to a specific example of a "first comparator" in the present disclosure.

The setting circuit 35I (FIG. 29) is configured to set the four weighting factors W to be used in the synapse circuit 31 and set the threshold THA to be used in the LIF circuit 32I, by performing the learning process on the basis of the four feature value signals SA and the feature value signals SBA, SBB, and SBC.

Figure 31:
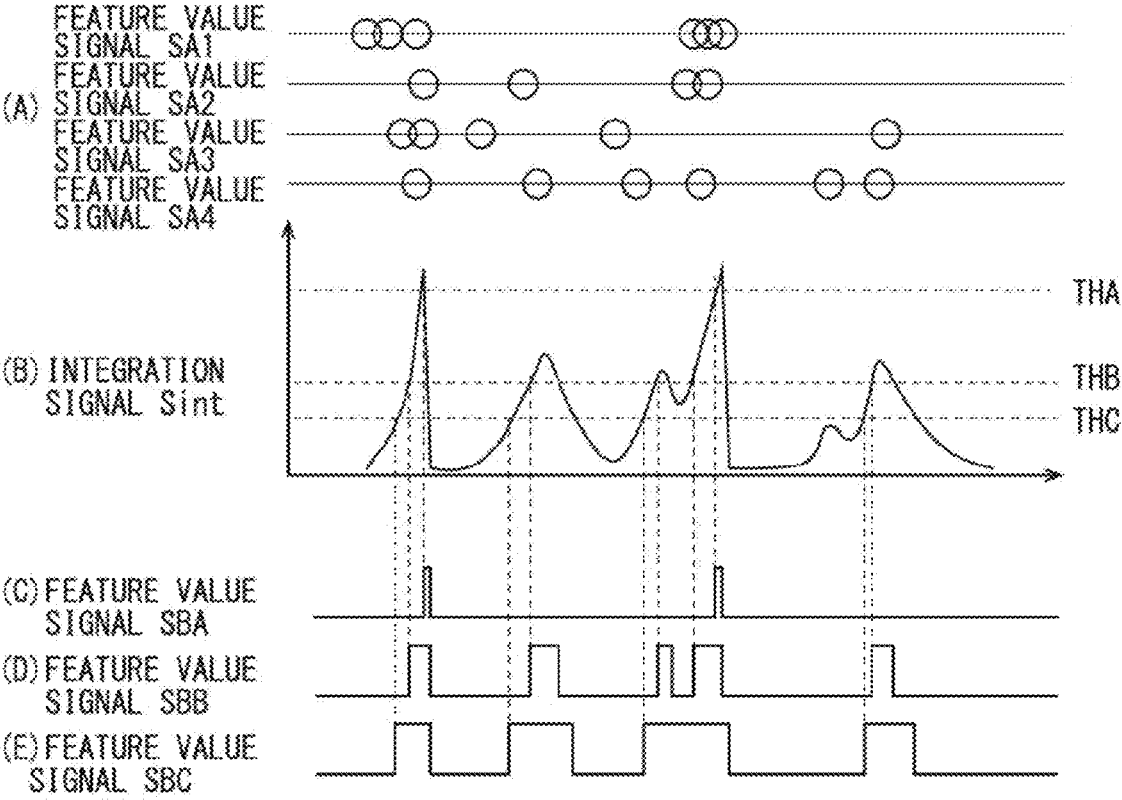
FIG. 31 is a timing waveform diagram illustrating an operation example of a neuron circuit illustrated in FIG. 29.

FIG. 31 illustrates an operation example of the neuron circuit 30B. In FIG. 31, (A) illustrates the four feature value signals SA (feature value signals SA1 to SA4) supplied to the neuron circuit 30B, (B) illustrates a waveform of the integration signal Sint generated by the integration circuit 33, (C) illustrates a waveform of the feature value signal SBA, (D) illustrates a waveform of the feature value signal SBB, and (E) illustrates a waveform of the feature value signal SBC. In this example, the threshold THB is set to "THA/2" and the threshold THC is set to "THA/3".

The comparison circuit 34A generates the feature value signal SBA by comparing the integration signal Sint with the threshold THA ((C) of FIG. 31). The comparison circuit 34B generates the feature value signal SBB by comparing the integration signal Sint with the threshold THB ((D) of FIG. 31). The comparison circuit 34C generates the feature value signal SBC by comparing the integration signal Sint with the threshold THC ((E) of FIG. 31).

In this manner, the neuron circuit 30B generates the feature value signals SBA, SBB, and SBC on the basis of the four feature value signals SA supplied from the connection controller 38. The output controller 39 generates the processing information INF on the basis of the feature value signals SBA, SBB, and SBC supplied from each of the multiple neuron circuits 30B.

In this example, the multiple thresholds TH are provided in the neuron circuit 30B in the subsequent stage, but the present disclosure is not limited thereto. For example, multiple thresholds TH may further be provided in the neuron circuit 30A in the preceding stage.

Figure 32:
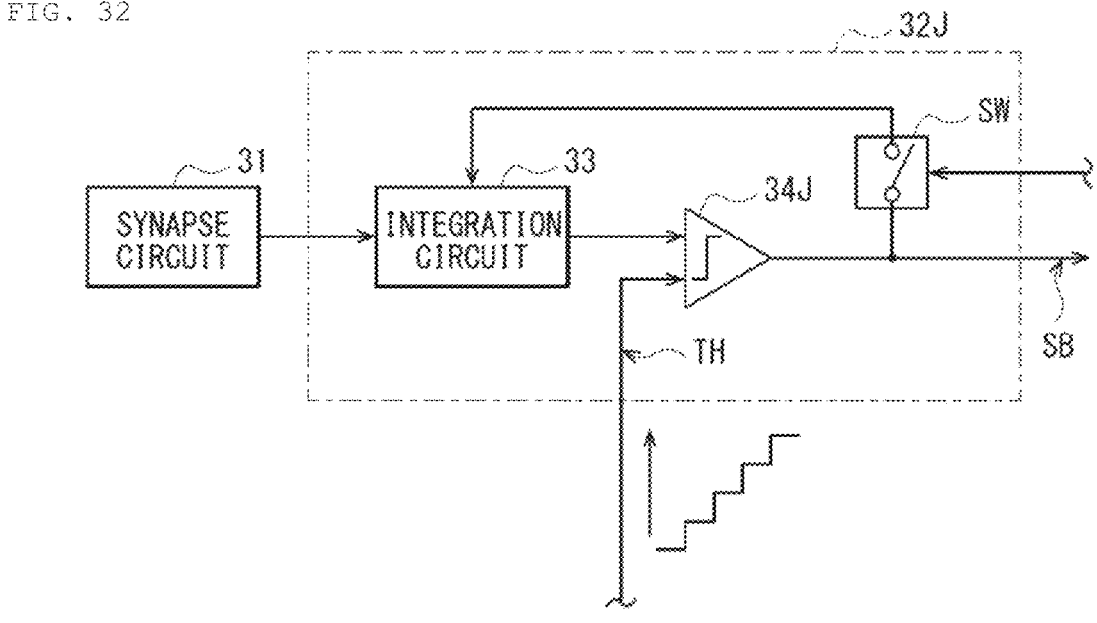
FIG. 32 is a block diagram illustrating a configuration example of a LIF circuit according to another modification example.

It is to be noted that, although the three comparison circuits 34A, 34B, and 34C having the thresholds TH different from each other are provided in the LIF circuit 32I in this example, the present disclosure is not limited thereto. For example, as in a LIF circuit 32J illustrated in FIG. 32, one comparison circuit may be provided, and the threshold TH may be changed stepwise. The LIF circuit 32J includes a comparison circuit 34J and a switch SW. The LIF circuit 32J is supplied with the threshold TH that varies over time. In this example, the threshold TH rises stepwise over time. The comparison circuit 34J generates the feature value signal SB by comparing the integration signal Sint supplied from the integration circuit 33 with the threshold TH. The switch SW is put into an on state when, for example, the threshold TH becomes highest. This enables the integration circuit 33 to reset the integration signal Sint on the basis of the feature value signal SB at this time.

In the pre-processing unit 12I (FIG. 29), the output controller 39 generates the processing information INF on the basis of the feature value signals SBA, SBB, and SBC supplied from each of the multiple neuron circuits 30B. The processing information INF may include information about an event frequency value. The present modification example will be described below.

Figure 33:
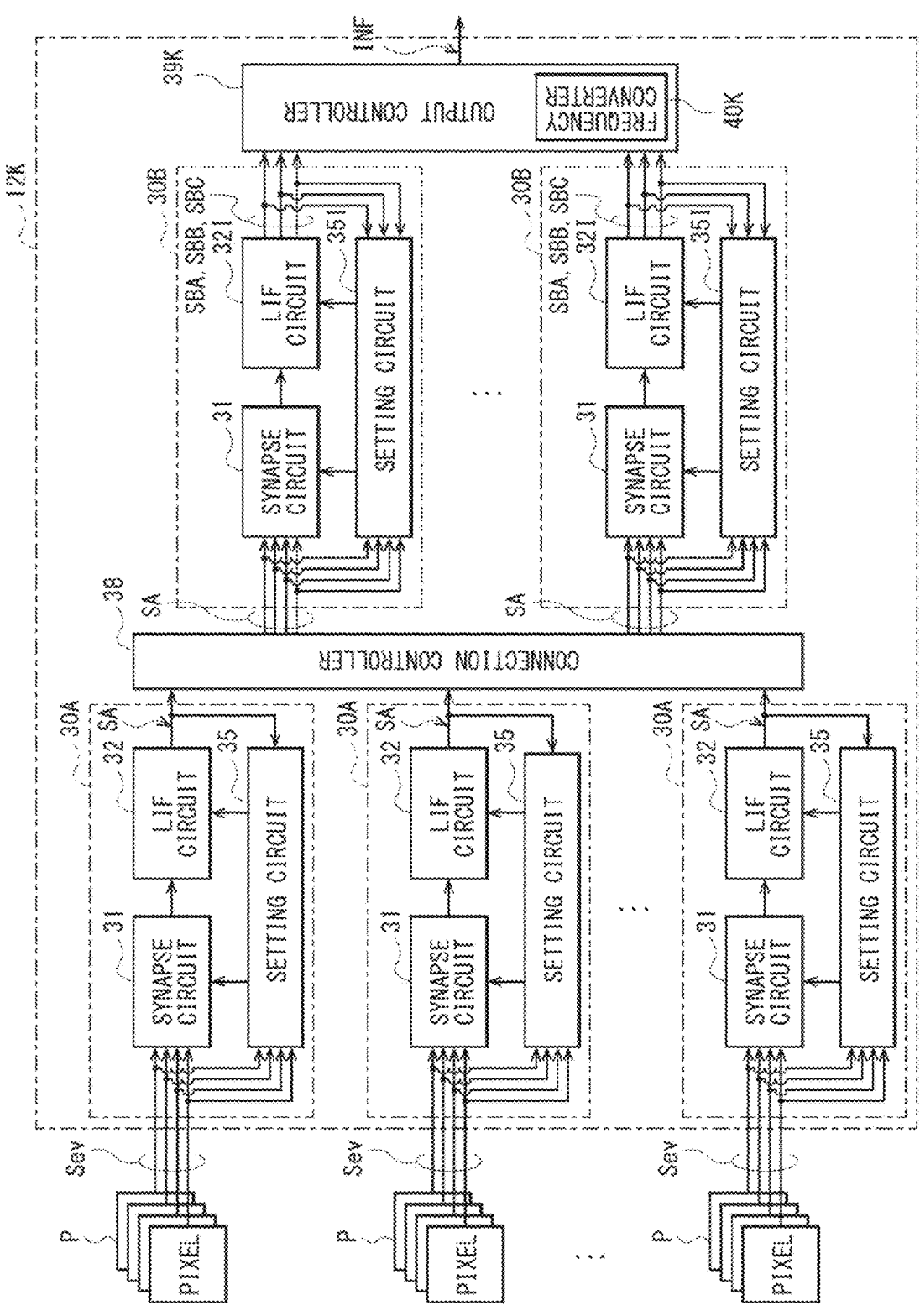
FIG. 33 is a block diagram illustrating a configuration example of a pre-processing unit according to another modification example.

FIG. 33 illustrates a configuration example of a pre-processing unit 12K according to the present modification example. The pre-processing unit 12K includes the neuron circuit 30B illustrated in FIG. 29 and an output controller 39K. In this example, in the pre-processing unit 12K, the period T having a predetermined time length is repeatedly set, as in the case of Modification Example 1 (FIG. 8).

The output controller 39K generates the processing information INF on the basis of the feature value signals SBA, SBB, and SBC supplied from each of the multiple neuron circuits 30B. The output controller 39K includes a frequency converter 40K. The frequency converter 40K is configured to generate the event frequency value on the basis of the feature value signals SBA, SBB, and SBC. Specifically, first, the output controller 39K generates the frame data DF illustrated in FIG. 9, on the basis of the feature value signals SBA, SBB, and SBC supplied from each of the multiple neuron circuits 30B. The frequency converter 40K converts the frame data DF into the event frequency value using, for example, a predetermined data table. The output controller 39K generates the processing information INF that includes information about the event frequency value generated by the frequency converter 40K.

Modification Example 10

In the above-described embodiment, the pixel array 11 directly supplies the event signal Sev to the pre-processing unit 12, but the present disclosure is not limited thereto. A sensor device 2 according to the present modification example will be described in detail below.

Figure 34:
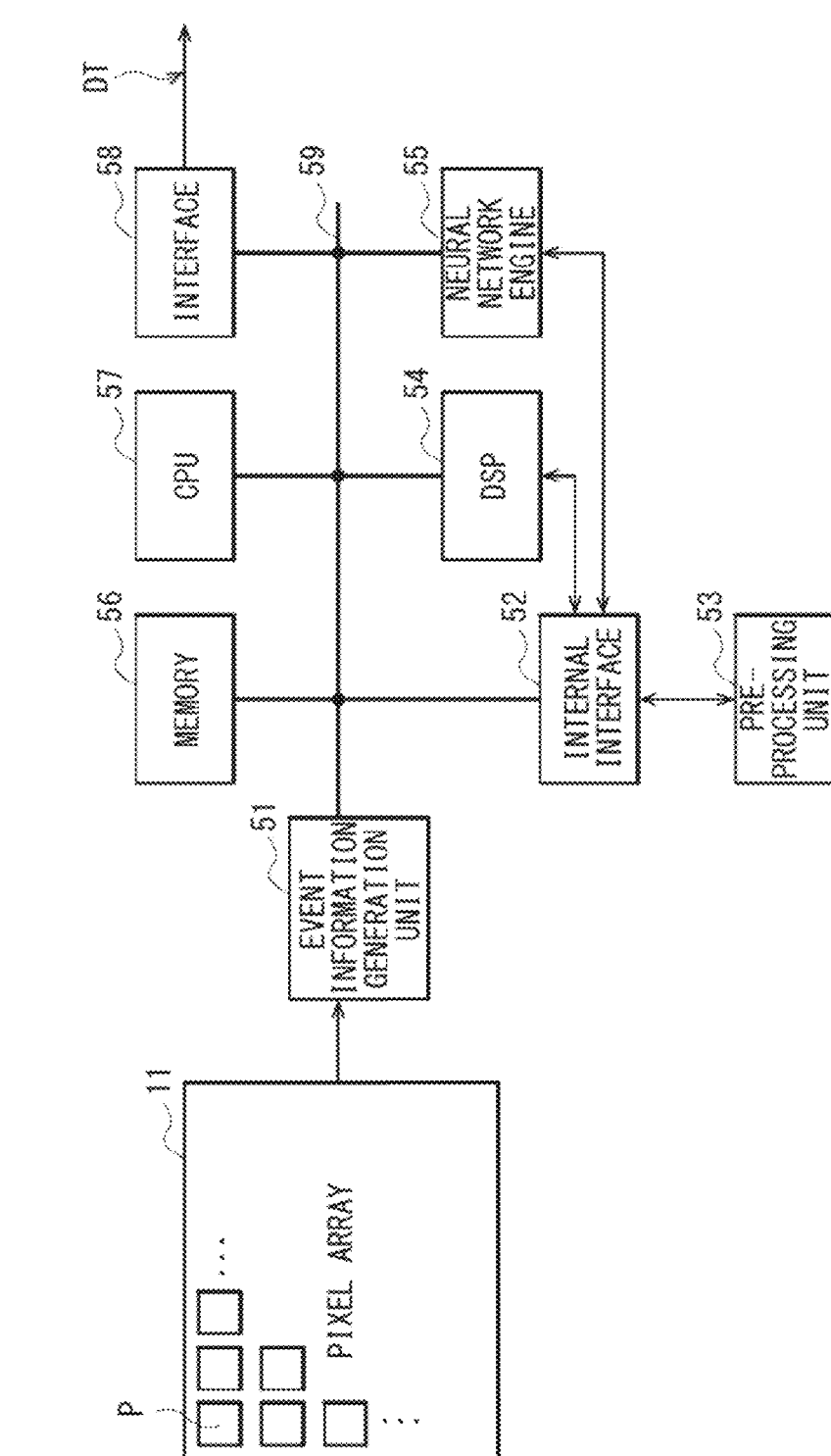
FIG. 34 is a block diagram illustrating a configuration example of a sensor device according to another modification example.

FIG. 34 illustrates a configuration example of the sensor device 2. The sensor device 2 includes the pixel array 11, an event information generation unit 51, an internal interface 52, a pre-processing unit 53, a DSP (Digital Signal Processor) 54, a neural network engine 55, a memory 56, a CPU (Central Processing Unit) 57, and an interface 58. The event information generation unit 51, the internal interface, the DSP 54, the neural network engine 55, the memory 56, the CPU 57, and the interface 58 are coupled to a bus 59.

The event information generation unit 51 is configured to generate, on the basis of the event signals Sev supplied from the multiple pixels P in the pixel array 11, event information INF0 including information about the position of the pixel P that generated the event signal Sev and information about a time when the event signal Sev was generated. Further, the event information generation unit 51 supplies the event information INF0 to the pre-processing unit 53 via the internal interface 52.

The internal interface 52 is an interface that exchanges data between the pre-processing unit 53 and other blocks.

The pre-processing unit 53 is configured to generate the processing information INF by performing processing similar to that in the pre-processing unit 12 according to the above-described embodiment, on the basis of the event information INF0 supplied from the event information generation unit 51 via the internal interface 52.

Figure 35:
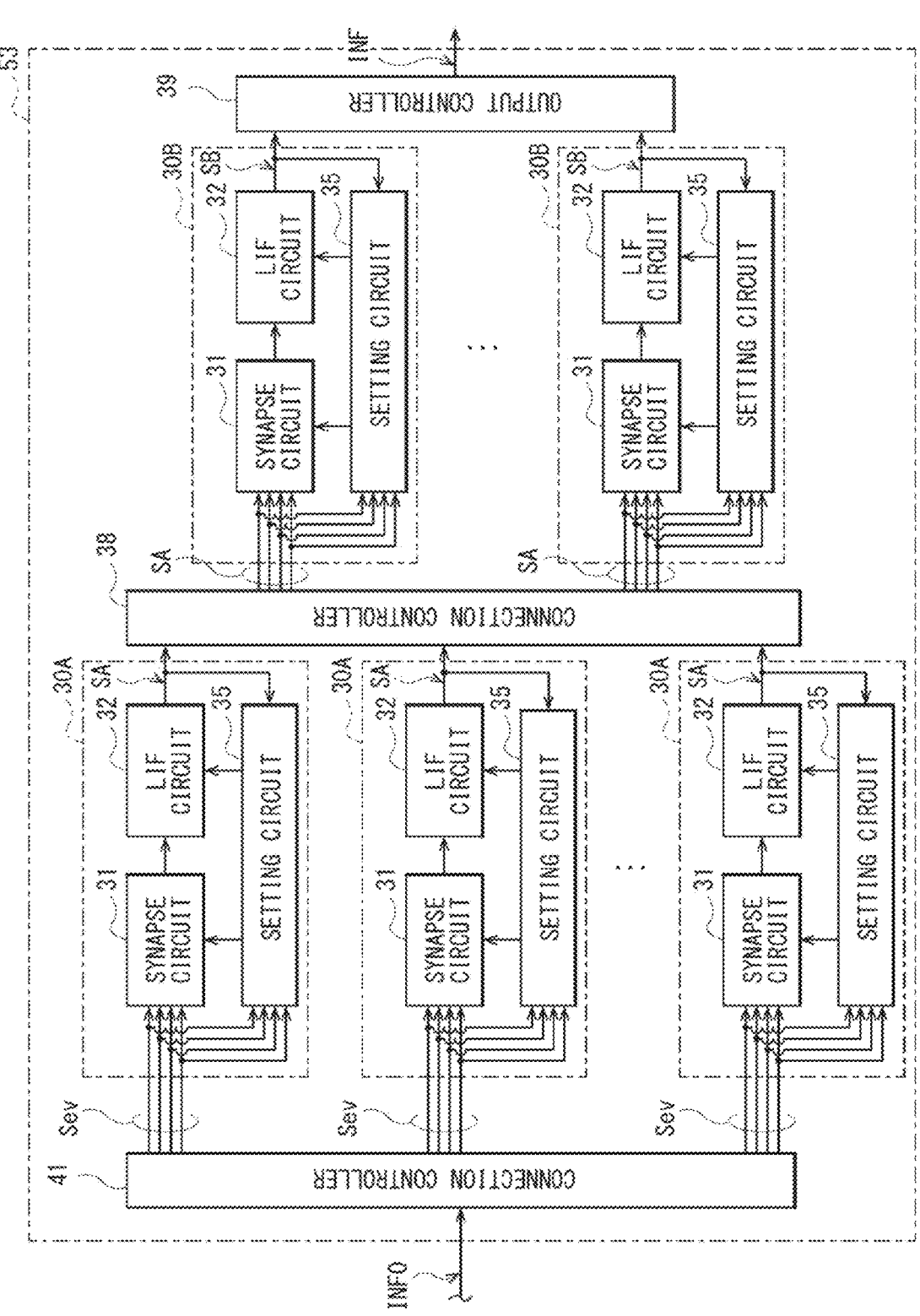
FIG. 35 is a block diagram illustrating a configuration example of a pre-processing unit illustrated in FIG. 34.

FIG. 35 illustrates a configuration example of the pre-processing unit 53. The pre-processing unit 53 includes a connection controller 41, the multiple neuron circuits 30A, the connection controller 38, the multiple neuron circuits 30B, and the output controller 39. The multiple neuron circuits 30A, the connection controller 38, the multiple neuron circuits 30B, and the output controller 39 are similar to those in the case of the above-described embodiment (FIG. 3).

The connection controller 41 is configured to generate the multiple event signals Sev to be supplied to the multiple neuron circuits 30A, on the basis of the event information INF0 supplied from the event information generation unit 51. Specifically, the connection controller 41 determines, on the basis of the information about the position of the pixel P that generated the event signal Sev and the information about the time when the event signal Sev was generated included in the event information INF0, to which neuron circuit 30A among the multiple neuron circuits 30A and at which timing each of the multiple event signals Sev is to be supplied. On the basis of the determination result, the connection controller 41 supplies the multiple event signals Sev to the multiple neuron circuits 30A.

The multiple neuron circuits 30A, the connection controller 38, the multiple neuron circuits 30B, and the output controller 39 operate in a manner similar to that in the above-described embodiment. Thus, the pre-processing unit 53 generates the processing information INF. Further, the pre-processing unit 53 supplies the generated processing information INF to the DSP 54 and the neural network engine 55 via the internal interface 52.

The DSP 54 is configured to perform processing on the basis of the processing information INF supplied from the pre-processing unit 53. The neural network engine 55 is configured to perform processing using the neural network NN on the basis of the processing information INF supplied from the pre-processing unit 53. The DSP 54 and the neural network engine 55 analyze the detection target of the sensor device 2, and supply the analysis result to the interface 58 as the data signal DT. The DSP 54 and the neural network engine 55 correspond to the processing unit 13 in the sensor device 1 according to the above-described embodiment.

The memory 56 is configured to store data to be used in a computing process by the CPU 57. The CPU 57 is configured to control the operation of the sensor device 2. The interface 58 is configured to output the data signal DT supplied from the DSP 54 and the neural network engine 55.

Modification Example 11

In the above-described embodiment, each pixel P detects the change in the received light amount, but the present disclosure is not limited thereto. For example, each pixel P may further detect the received light amount. The present modification example will be described in detail below.

Figure 36:
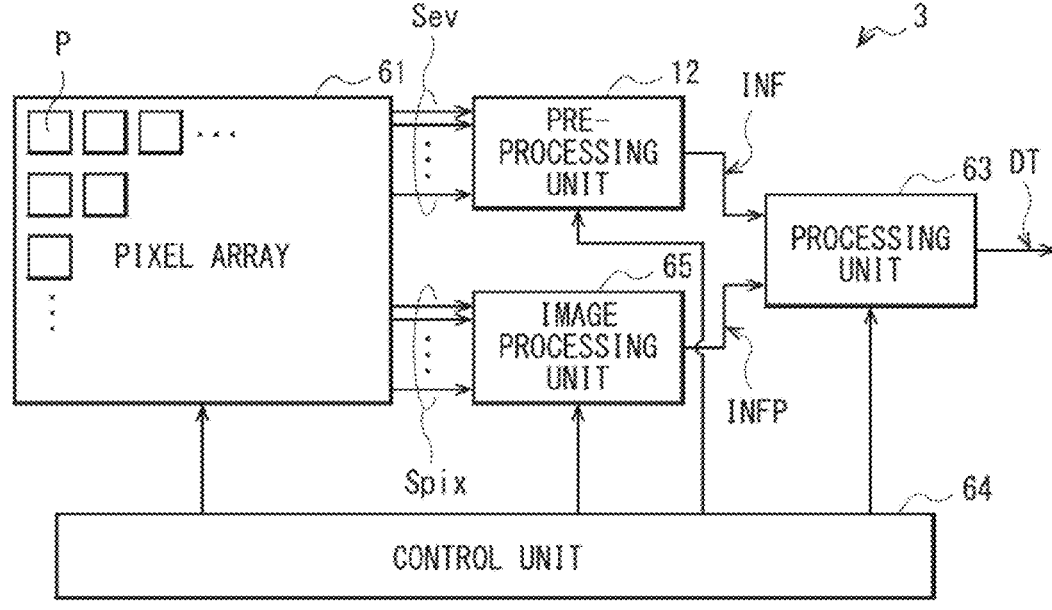
FIG. 36 is a block diagram illustrating a configuration example of an imaging device according to another modification example.

FIG. 36 illustrates an example of an imaging device 3 according to the present modification example. The imaging device 3 includes a pixel array 61, the pre-processing unit 12, an image processing unit 65, and a processing unit 63.

The pixel array 61 includes the multiple pixels P arranged in a matrix. The pixel P is configured to generate the event signal Sev corresponding to the presence or absence of an event, and a pixel signal Spix corresponding to the received light amount. It is to be noted that, although each of the multiple pixels P generates the event signal Sev and the pixel signal Spix in this example, the present disclosure is not limited thereto. For example, the multiple pixels P may include a pixel that generates the event signal Sev, and a pixel that generates the pixel signal Spix.

The pre-processing unit 12 is configured to generate the processing information INF by performing processing on the basis of the multiple event signals Sev generated by the pixel array 61.

The image processing unit 65 is configured to generate image information INFP indicating a captured image, by performing image processing on the basis of the multiple pixel signals Spix generated by the pixel array 61. Here, the image processing unit 65 corresponds to a specific example of an "image processing circuit" in the present disclosure. The image information INFP corresponds to a specific example of "image information" in the present disclosure.

The processing unit 63 is configured to analyze the detection target of the sensor device 1 using the neural network NN, on the basis of the processing information INF and the image information INFP, and output the analysis result as the data signal DT.

Figure 37:
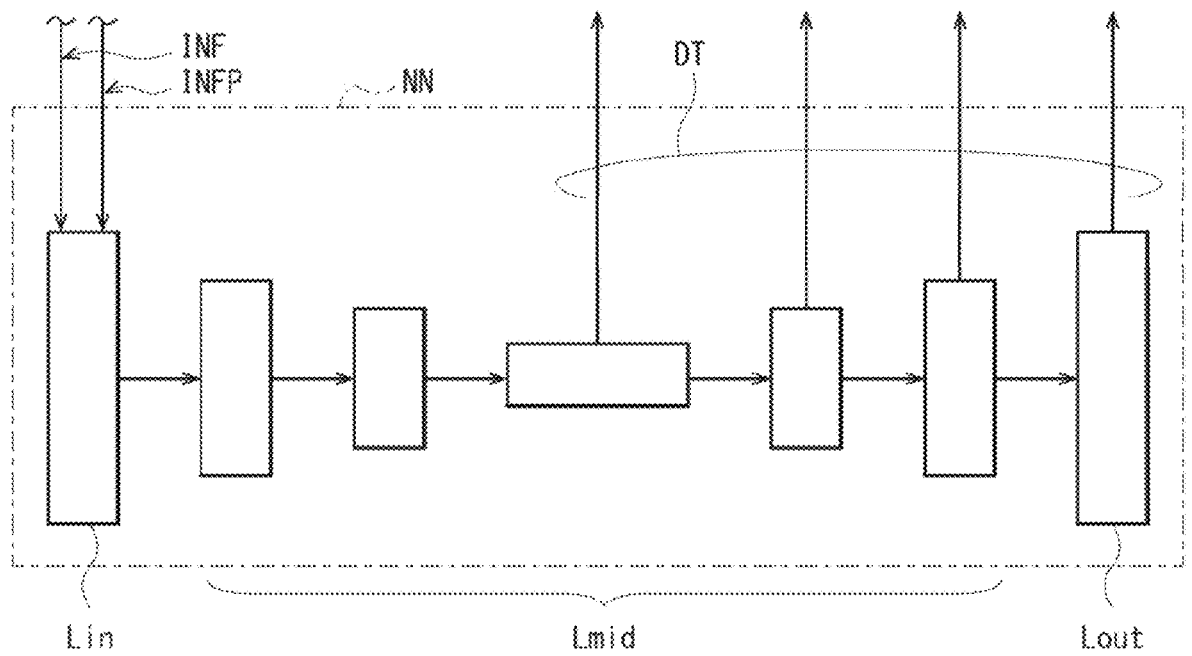
FIG. 37 is an explanatory diagram illustrating an example of a neural network in a processing unit illustrated in FIG. 36.

FIG. 37 schematically illustrates an example of the neural network NN in the processing unit 63. The processing unit 63 uses this neural network NN to perform processing on the basis of the processing information INF and the image information INFP inputted to the input layer Lin. Further, in this example, the processing unit 63 outputs information obtained by the intermediate layers Lmid and the output layer Lout as the data signal DT.

Figure 38:
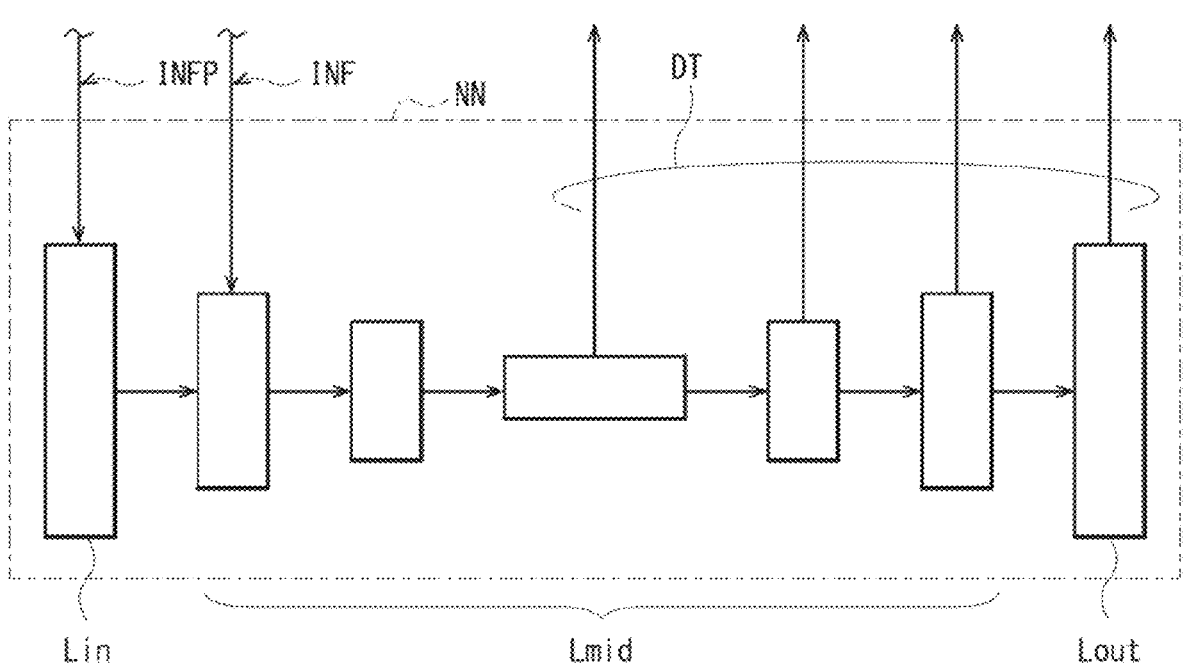
FIG. 38 is an explanatory diagram illustrating another example of the neural network in the processing unit illustrated in FIG. 36.

FIG. 38 schematically illustrates another example of the neural network NN in the processing unit 63. In this example, the processing unit 63 uses this neural network NN to perform processing on the basis of the image information INFP inputted to the input layer Lin and the processing information INF inputted to one of the intermediate layers Lmid. Further, in this example, the processing unit 63 outputs information obtained by the intermediate layers Lmid and the output layer Lout as the data signal DT.

Thus, in the imaging device 3, the processing information INF and the image information INFP are supplied to the processing unit 63. In the pre-processing unit 12, for example, appropriately setting the threshold TH in the comparison circuit 34 makes it possible to reduce the data rate of the feature value signal SA. This makes it possible to, for example, match the data rate of the processing information INF with a data rate of the image information INFP. This enables the imaging device 3 to perform a so-called multi-modal analysis that analyzes both event information and image information, which makes it possible to increase analysis accuracy.

Specifically, for example, in a case where a subject moves, the subject can be slightly blurred in the captured image. In the imaging device 3, the processing unit 63 performs processing on the basis of the processing information INF and the image information INFP, which makes it possible to obtain image information with reduced blur.

It is to be noted that, although the pixel array 61 generates the event signal Sev and the pixel signal Spix in this example, the present disclosure is not limited thereto. Alternatively, a pixel array that generates the event signal Sev and a pixel array that generates the pixel signal Spix may be provided separately.

Modification Example 12

In the above-described embodiment, the pixel array 11, the pre-processing unit 12, the processing unit 13, and the control unit 14 are provided, as illustrated in FIG. 1. The pixel array 11, the pre-processing unit 12, and the processing unit 13 may be configured as one device including one or more semiconductor substrates. The pixel array 11 and the pre-processing unit 12 may be configured as one device, and the processing unit 13 may be configured as another device. Alternatively, the pixel array 11, the pre-processing unit 12, and the processing unit 13 may be configured as respective separate devices.

The sensor device 1 is formed, for example, on multiple semiconductor substrates.

Figure 39:
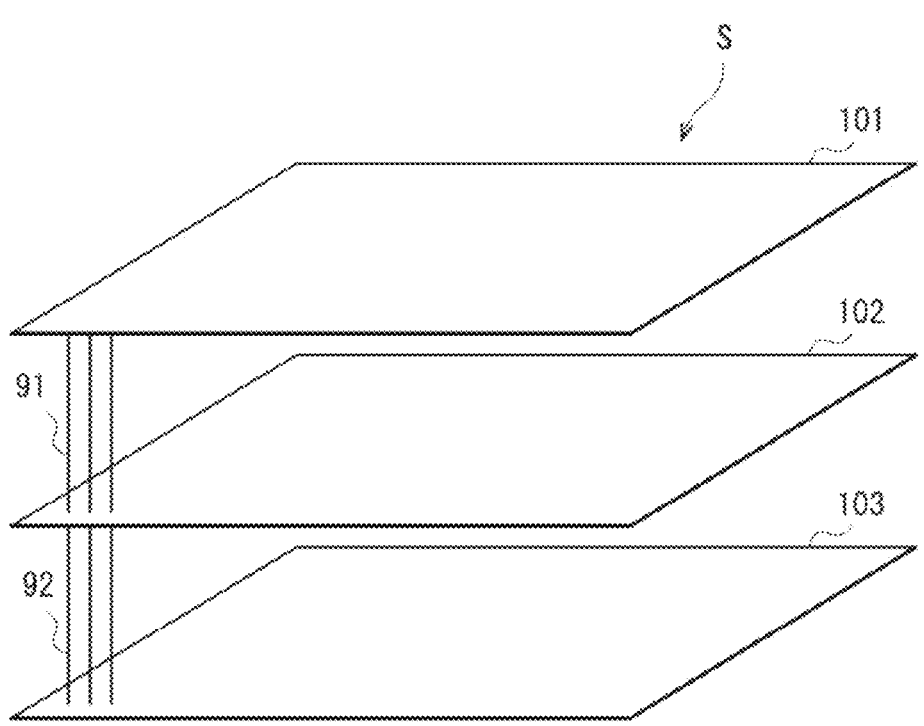
FIG. 39 is an explanatory diagram illustrating an implementation example of a sensor device.

FIG. 39 illustrates an implementation example of the sensor device 1. The sensor device 1 is formed on three semiconductor substrates 101, 102, and 103 in this example. The semiconductor substrate 101 is disposed on side of a sensor surface S in the sensor device 1, the semiconductor substrate 103 is disposed on side opposite to the sensor surface S, and the semiconductor substrate 102 is disposed between the semiconductor substrate 101 and the semiconductor substrate 103. The semiconductor substrate 101 and the semiconductor substrate 102 are superimposed on each other, and semiconductor substrate 102 and the semiconductor substrate 103 are superimposed on each other. A wiring line of the semiconductor substrate 101 and a wiring line of the semiconductor substrate 102 are coupled by a wiring line 91. The wiring line of the semiconductor substrate 102 and a wiring line of the semiconductor substrate 103 are coupled by a wiring line 92. The wiring lines 91 and 92 may use, for example, a metallic bond such as Cu—Cu.

Figure 40:
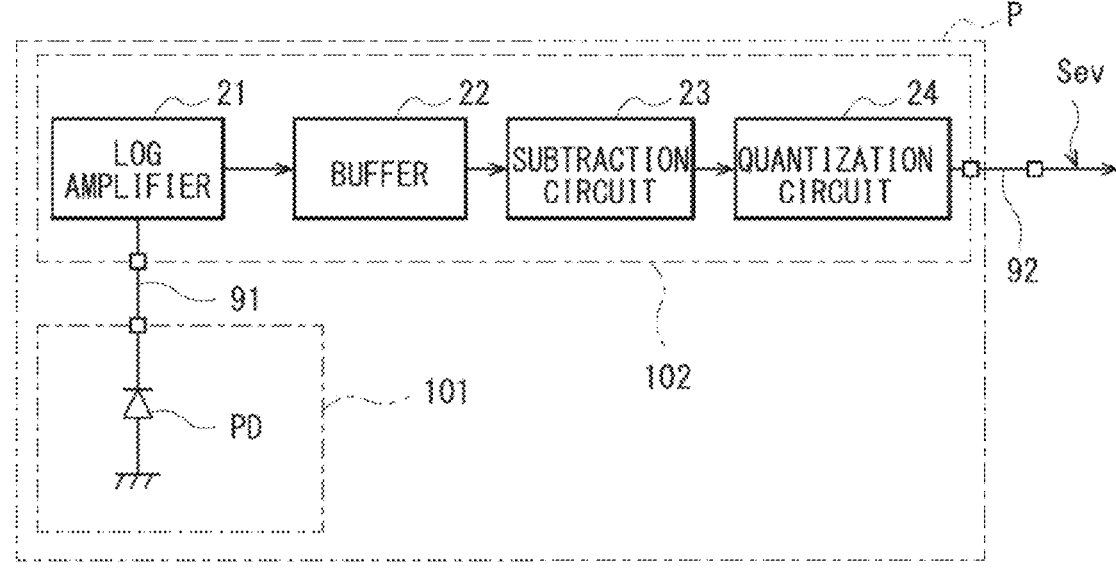
FIG. 40 is an explanatory diagram illustrating a configuration example of a pixel.

FIG. 40 illustrates an example of the pixel P in a case where the sensor device 1 is formed on the three semiconductor substrates 101 to 103. In this example, the photodiode PD is formed on the semiconductor substrate 101. The LOG amplifier 21, the buffer 22, the subtraction circuit 23, and the quantization circuit 24 are formed on the semiconductor substrate 102. Further, the pre-processing unit 12 and the processing unit 13 are formed on the semiconductor substrate 103. The photodiode PD on the semiconductor substrate 101 and the LOG amplifier 21 on the semiconductor substrate 102 are coupled to each other via the wiring line 91. The quantization circuit 24 on the semiconductor substrate 102 and the pre-processing unit 12 are coupled to each other via the wiring line 92.

Figure 41:
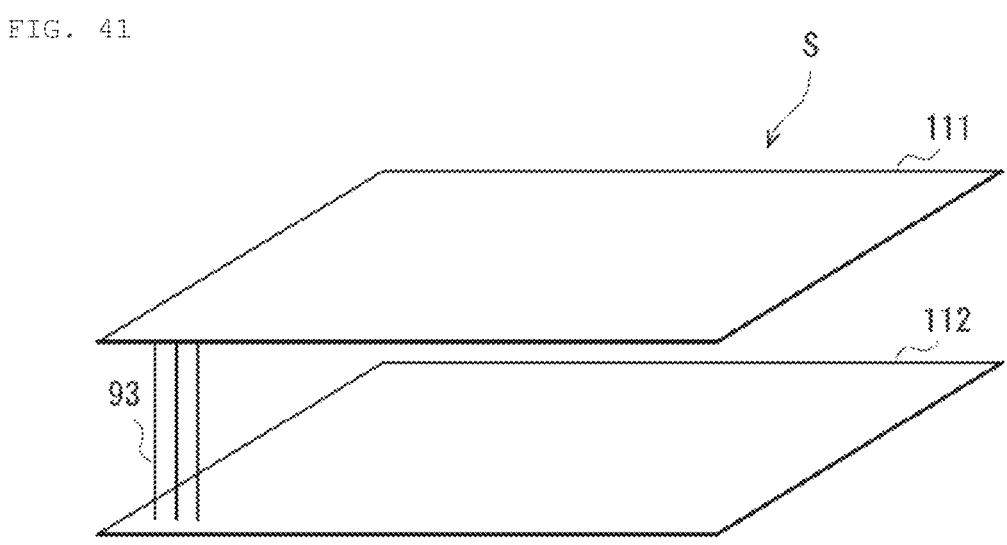
FIG. 41 is an explanatory diagram illustrating another implementation example of a sensor device.

FIG. 41 illustrates another implementation example of the sensor device 1. In this example, the sensor device 1 is formed on two semiconductor substrates 111 and 112. The semiconductor substrate 111 is disposed on the side of the sensor surface S in the sensor device 1, and the semiconductor substrate 112 is disposed on the side opposite to the sensor surface S. The semiconductor substrate 111 and the semiconductor substrate 112 are superimposed on each other. A wiring line of the semiconductor substrate 111 and a wiring line of the semiconductor substrate 112 are coupled by a wiring line 93. The wiring line 93 may use, for example, a metallic bond such as Cu—Cu.

Figure 42:
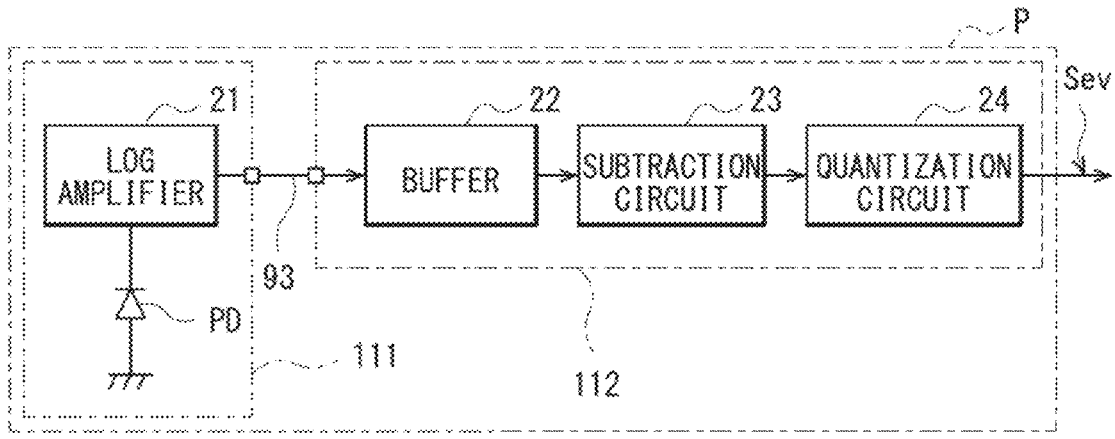
FIG. 42 is an explanatory diagram illustrating a configuration example of a pixel.

FIG. 42 illustrates an example of the pixel Pin a case where the sensor device 1 is formed on the two semiconductor substrates 111 and 112. In this example, the photodiode PD and the LOG amplifier 21 are formed on the semiconductor substrate 111. The buffer 22, the subtraction circuit 23, and the quantization circuit 24 are formed on the semiconductor substrate 112. The pre-processing unit 12 and the processing unit 13 are formed on the semiconductor substrate 112. The LOG amplifier 21 on the semiconductor substrate 111 and the buffer 22 on the semiconductor substrate 112 are coupled to each other via the wiring line 93.

Figure 43:
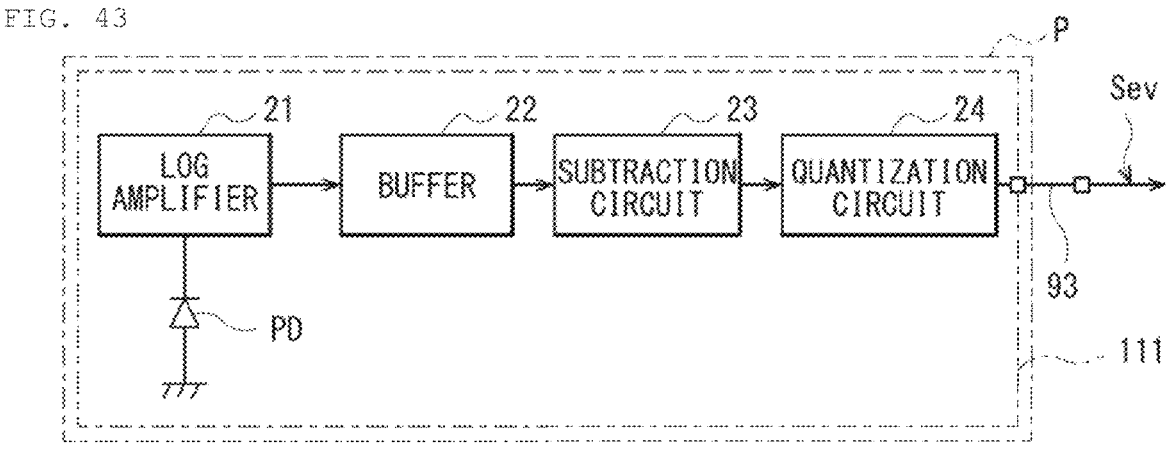
FIG. 43 is an explanatory diagram illustrating another configuration example of the pixel.

FIG. 43 illustrates another example of the pixel P in the case where the sensor device 1 is formed on the two semiconductor substrates 111 and 112. In this example, the photodiode PD, the LOG amplifier 21, the buffer 22, the subtraction circuit 23, and the quantization circuit 24 are formed on the semiconductor substrate 111. The pre-processing unit 12 and the processing unit 13 are formed on the semiconductor substrate 112. The quantization circuit 24 on the semiconductor substrate 111 and the pre-processing unit 12 on the semiconductor substrate 112 are coupled to each other via the wiring line 93.

Other Modification Examples

In addition, two or more of these modification examples may be combined.

2. Example of Application to Mobile Body

The technology (present technology) according to the present disclosure is applicable to various products. For example, the technology according to the present disclosure may be implemented as a device mounted on any type of mobile body such as an automobile, an electric vehicle, a hybrid electric vehicle, a motorcycle, a bicycle, a personal mobility, an airplane, a drone, a vessel, or a robot.

Figure 44:
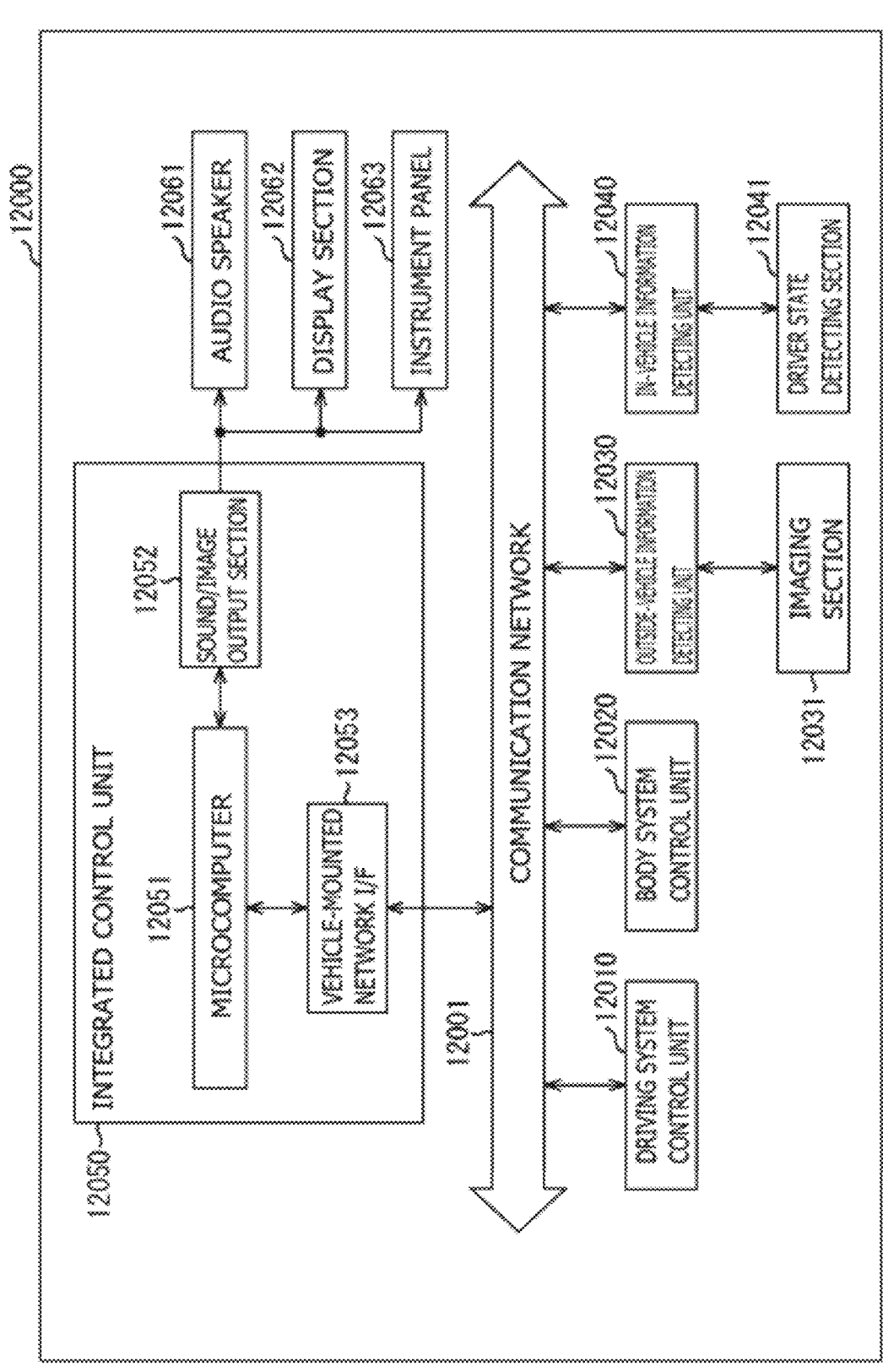
FIG. 44 is a block diagram depicting an example of schematic configuration of a vehicle control system.

FIG. 44 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 44, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 44, an audio speaker 12061, a display section 12062, and an instrument panel 12063 are illustrated as the output device. The display section 12062 may, for example, include at least one of an on-board display and a head-up display.

Figure 45:
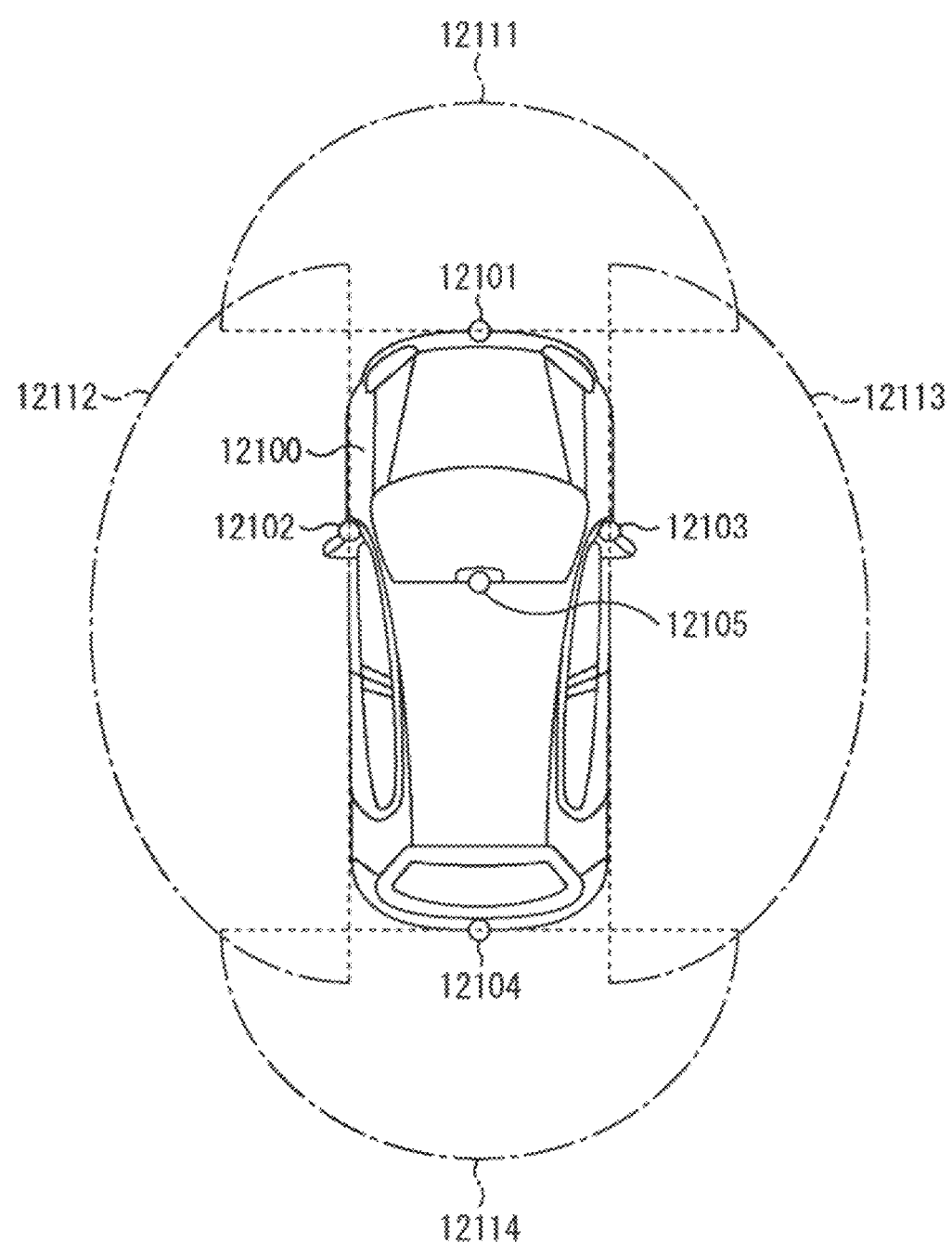
FIG. 45 is a diagram of assistance in explaining an example of installation positions of an outside-vehicle information detecting section and an imaging section.

FIG. 45 is a diagram depicting an example of the installation position of the imaging section 12031.

In FIG. 45, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 45 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure may be applied has been described above. The technology according to the present disclosure may be applied to the imaging section 12031 among the components described above. Accordingly, in the vehicle control system 12000, the processing information INF is generated by the pre-processing unit 12 on the basis of the event signals Sev generated by the pixel array 11, and processing using the neural network NN is performed by the processing unit 13 on the basis of the processing information INF. This enables data to be transmitted without an I/O, which makes it possible to reduce power consumption. In addition, the pre-processing unit 12 is able to lower the data rate, making it possible to shorten a delay time. This enables the vehicle control system 12000 to, for example, perform the vehicle control in a short response time, while reducing the power consumption.

Although the present technology has been described with reference to the embodiments, the modification examples, and specific application examples thereof, the present technology is not limited to these embodiments and the like, and various modifications may be made.

For example, in the above-described embodiment, the four pixels P are coupled to the neuron circuit 30A as illustrated in FIG. 3, but the present disclosure is not limited thereto. Alternatively, for example, three or less pixels P may be coupled to the neuron circuit 30A, or five or more pixels P may be coupled to the neuron circuit 30A.

In addition, for example, in the above-described embodiment, the pre-processing unit 12 includes the multiple neuron circuits 30 in two stages. Specifically, the pre-processing unit 12 includes the multiple neuron circuits 30A disposed in the preceding stage and the multiple neuron circuits 30B disposed in the subsequent stage, but the present disclosure is not limited thereto. Alternatively, the multiple neuron circuits 30 in three or more stages may be provided.

It is to be noted that the effects described in the present specification are merely illustrative and non-limiting, and other effects may be provided.

It is to be noted that the present technology may be configured as below. According to the present technology with the following configuration, it is possible to reduce a computation amount of a processing circuit.

(1)

A sensor device including:

multiple pixel circuits each of which includes a light receiver and generates an event signal corresponding to presence or absence of an event in accordance with a light reception result of the light receiver; and a pre-processing circuit that generates processing information on the basis of the multiple event signals, and supplies the processing information to a processing circuit including a neural network, in which the pre-processing circuit includes a first weighted addition circuit that performs a weighted addition process on the basis of two or more of the event signals generated by respective two or more pixel circuits among the multiple pixel circuits, and a first determination circuit that generates a first feature value signal on the basis of a result of the weighted addition process in the first weighted addition circuit, and the pre-processing circuit generates the processing information on the basis of the first feature value signal.

(2)

The sensor device according to (1), in which the first determination circuit includes a first integration circuit that generates a first integration signal by integrating the result of the weighted addition process in the first weighted addition circuit, and a first comparison circuit that generates the first feature value signal by comparing the first integration signal with a threshold.

(3)

The sensor device according to (2), in which the pre-processing circuit further includes a setting circuit that sets a weighting factor in the weighted addition process and the threshold on the basis of the first feature value signal, by performing a learning process.

(4)

The sensor device according to (3), in which the setting circuit sets the weighting factor and the threshold on the basis of the first feature value signal and the two or more event signals.

(5)

The sensor device according to any one of (1) to (4), in which the pre-processing circuit generates the processing information by performing processing each time the event occurs, on the basis of the multiple event signals.

(6)

The sensor device according to any one of (1) to (4), in which the pre-processing circuit generates the processing information by performing processing, each time a predetermined time elapses, on the basis of the multiple event signals in the predetermined time.

(7)

The sensor device according to (6), in which the processing information includes information corresponding to the presence or absence of the event in the predetermined time.

(8)

The sensor device according to (6), in which the processing information includes information corresponding to a number of the events in the predetermined time.

(9)

The sensor device according to any one of (1) to (8), in which the pre-processing circuit further includes a control circuit that controls operation of the two or more pixel circuits, on the basis of the two or more event signals.

(10)

The sensor device according to (9), in which the control circuit controls operation timing of the two or more pixel circuits in accordance with movement of a detection target.

(11)

The sensor device according to any one of (1) to (10), in which the pre-processing circuit includes a second weighted addition circuit that performs the weighted addition process on the basis of two or more feature value signals, a second determination circuit that generates a second feature value signal on the basis of a result of the weighted addition process in the second weighted addition circuit, and an output control circuit that generates the processing information on the basis of multiple signals including the second feature value signal.

(12)

The sensor device according to (11), in which the second determination circuit includes a second integration circuit that generates a second integration signal by integrating the result of the weighted addition process in the second weighted addition circuit, and a second comparison circuit that generates the second feature value signal by comparing the second integration signal with each of multiple thresholds that differ from each other.

(13)

The sensor device according to (12), in which the second comparison circuit includes multiple comparators that compare the second integration signal with the respective multiple thresholds, the multiple comparators include a first comparator, and the second integration circuit is reset on the basis of a comparison result of the first comparator.

(14)

The sensor device according to (13), in which the first comparator compares the second integration signal with a first threshold that is highest of the multiple thresholds.

(15)

The sensor device according to (14), in which the multiple comparators include a second comparator, and the second comparator compares the second integration signal with a second threshold that is an integer fraction of the first threshold.

(16)

The sensor device according to any one of (1) to (15), in which the event includes a first event corresponding to an increase in a received light amount in the light receiver, and a second event corresponding to a decrease in the received light amount.

(17)

The sensor device according to any one of (1) to (16), in which the processing information includes information corresponding to a position of a pixel circuit where the event has occurred among the multiple pixel circuits.

(18)

The sensor device according to any one of (1) to (17), further including the processing circuit.

(19)

The sensor device according to any one of (1) to (18), further including an image processing circuit, in which each of the multiple pixel circuits further generates a pixel signal corresponding to a received light amount in the light receiver, the image processing circuit generates image information by performing image processing on the basis of the multiple pixel signals generated by the multiple pixel circuits, and the processing circuit performs processing using the neural network, on the basis of the processing information and the image information.

(20)

A semiconductor device including a pre-processing circuit that generates processing information on the basis of multiple event signals corresponding to presence or absence of events and generated by multiple pixel circuits, and supplies the processing information to a processing circuit including a neural network, in which the pre-processing circuit includes a first weighted addition circuit that performs a weighted addition process on the basis of two or more of the event signals generated by respective two or more pixel circuits among the multiple pixel circuits, and a first determination circuit that generates a first feature value signal on the basis of a result of the weighted addition process in the first weighted addition circuit, and the pre-processing circuit generates the processing information on the basis of the first feature value signal.

It should be understood by those skilled in the art that various modifications, combinations, sub-combinations, and alterations may occur depending on design requirements and other factors insofar as they are within the scope of the appended claims or the equivalents thereof.

The invention claimed is:

1. A sensor device comprising:

multiple pixel circuits each of which includes a light receiver and generates an event signal corresponding to presence or absence of an event in accordance with a light reception result of the light receiver; and a pre-processing circuit that generates processing information on a basis of the multiple event signals, and supplies the processing information to a processing circuit including a neural network, wherein the pre-processing circuit includes a first weighted addition circuit that performs a weighted addition process on a basis of two or more of the event signals generated by respective two or more pixel circuits among the multiple pixel circuits, a first determination circuit that generates a first feature value signal on a basis of a result of the weighted addition process in the first weighted addition circuit, a first integration circuit that generates a first integration signal by integrating the result of the weighted addition process in the first weighted addition circuit, a first comparison circuit that generates the first feature value signal by comparing the first integration signal with a threshold, and a setting circuit that sets a weighting factor in the weighted addition process and the threshold based on the first feature value signal, by performing a learning process, wherein the pre-processing circuit generates the processing information based on the first feature value signal.

2. The sensor device according to claim 1, wherein the setting circuit sets the weighting factor and the threshold on a basis of the first feature value signal and the two or more event signals.

3. The sensor device according to claim 1, wherein the pre-processing circuit generates the processing information by performing processing each time the event occurs, on the basis of the multiple event signals.

4. The sensor device according to claim 1, wherein the pre-processing circuit generates the processing information by performing processing, each time a predetermined time elapses, on a basis of the multiple event signals in the predetermined time.

5. The sensor device according to claim 4, wherein the processing information includes information corresponding to the presence or absence of the event in the predetermined time.

6. The sensor device according to claim 4, wherein the processing information includes information corresponding to a number of the events in the predetermined time.

7. The sensor device according to claim 1, wherein the pre-processing circuit further includes a control circuit that controls operation of the two or more pixel circuits, on the basis of the two or more event signals.

8. The sensor device according to claim 7, wherein the control circuit controls operation timing of the two or more pixel circuits in accordance with movement of a detection target.

9. The sensor device according to claim 1, wherein the pre-processing circuit includes a second weighted addition circuit that performs the weighted addition process on a basis of two or more feature value signals, a second determination circuit that generates a second feature value signal on a basis of a result of the weighted addition process in the second weighted addition circuit, the second determination circuit including a second integration circuit that generates a second integration signal by integrating the result of the weighted addition process in the second weighted addition circuit, and a second comparison circuit that generates the second feature value signal by comparing the second integration signal with each of multiple thresholds that differ from each other, and an output control circuit that generates the processing information on a basis of multiple signals including the second feature value signal.

10. The sensor device according to claim 9, wherein the second comparison circuit includes multiple comparators that compare the second integration signal with the respective multiple thresholds, the multiple comparators include a first comparator, and the second integration circuit is reset on a basis of a comparison result of the first comparator.

11. The sensor device according to claim 10, wherein the first comparator compares the second integration signal with a first threshold that is highest of the multiple thresholds.

12. The sensor device according to claim 11, wherein the multiple comparators include a second comparator, and the second comparator compares the second integration signal with a second threshold that is an integer fraction of the first threshold.

13. The sensor device according to claim 1, wherein the event includes a first event corresponding to an increase in a received light amount in the light receiver, and a second event corresponding to a decrease in the received light amount.

14. The sensor device according to claim 1, wherein the processing information comprises information corresponding to a position of a pixel circuit where the event has occurred among the multiple pixel circuits.

15. The sensor device according to claim 1, further comprising the processing circuit.

16. The sensor device according to claim 1, further comprising an image processing circuit, wherein each of the multiple pixel circuits further generates a pixel signal corresponding to a received light amount in the light receiver, the image processing circuit generates image information by performing image processing on a basis of the multiple pixel signals generated by the multiple pixel circuits, and the processing circuit performs processing using the neural network, on a basis of the processing information and the image information.

17. A semiconductor device comprising:

a pre-processing circuit that generates processing information on a basis of multiple event signals corresponding to presence or absence of events and generated by multiple pixel circuits, and supplies the processing information to a processing circuit including a neural network, wherein the pre-processing circuit includes a first weighted addition circuit that performs a weighted addition process on a basis of two or more of the event signals generated by respective two or more pixel circuits among the multiple pixel circuits, a first determination circuit that generates a first feature value signal on a basis of a result of the weighted addition process in the first weighted addition circuit, a first integration circuit that generates a first integration signal by integrating the result of the weighted addition process in the first weighted addition circuit, a first comparison circuit that generates the first feature value signal by comparing the first integration signal with a threshold, and a setting circuit that sets a weighting factor in the weighted addition process and the threshold based on the first feature value signal, by performing a learning process, wherein the pre-processing circuit generates the processing information on a basis of the first feature value signal.

18. The semiconductor device according to claim 17, wherein the pre-processing circuit further includes a control circuit configured to delay a portion of the two or more event signals based on a predicted movement direction of a detection target, and the first weighted addition circuit performs the weighted addition process based on the delayed event signals.

19. The semiconductor device according to claim 17, wherein the pre-processing circuit further includes a control circuit configured to supply a reset signal to the multiple pixel circuits to selectively operate pixels within a specific region, wherein the control circuit causes pixel circuits outside the specific region to maintain a sampling operation based on the reset signal to prevent generation of the event signals.

20. A non-transitory computer readable storage device having computer readable instructions that when executed by circuitry cause the circuitry to:

pre-process information on a basis of multiple event signals corresponding to presence or absence of events and generated by multiple pixel circuits, and supplies the processing information to a processing circuit including a neural network, including performing a first weighted addition process based on two or more of the event signals generated by respective two or more pixel circuits among the multiple pixel circuits, generating a first feature value signal based on a result of the first weighted addition process in the first weighted addition circuit, performing a second weighted addition process based on two or more feature value signals, generating a second feature value signal on a basis of a result of the weighted addition process in the second weighted addition circuit, including generating a second integration signal by integrating the result of the second weighted addition process, and comparing the second integration signal with each of multiple thresholds that differ from each other to generate a second feature value signal, and generating processing information based on multiple signals including the second feature value signal, wherein the pre-process generates the processing information based on the first feature value signal.

* * * * *